US011787446B2

(12) United States Patent
Suzuki et al.

(10) Patent No.: US 11,787,446 B2
(45) Date of Patent: *Oct. 17, 2023

(54) VEHICLE

(71) Applicant: TOYOTA JIDOSHA KABUSHIKI KAISHA, Toyota (JP)

(72) Inventors: Ikuma Suzuki, Okazaki (JP); Yuta Ohashi, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 316 days.

This patent is subject to a terminal disclaimer.

(21) Appl. No.: 17/156,680

(22) Filed: Jan. 25, 2021

(65) Prior Publication Data

US 2021/0245785 A1 Aug. 12, 2021

(30) Foreign Application Priority Data

Jan. 31, 2020 (JP) ................................ 2020-015724

(51) Int. Cl.
*B60W 60/00* (2020.01)
*B60W 30/18* (2012.01)
*B60W 50/10* (2012.01)

(52) U.S. Cl.
CPC .. *B60W 60/0059* (2020.02); *B60W 30/18109* (2013.01); *B60W 50/10* (2013.01); *B60W 60/001* (2020.02); *B60W 2510/18* (2013.01)

(58) Field of Classification Search
None
See application file for complete search history.

(56) References Cited

U.S. PATENT DOCUMENTS

| 10,940,864 | B2 * | 3/2021 | Heckmann | ............. G08G 1/165 |
| 2016/0221549 | A1 * | 8/2016 | Tanase | ...................... B60T 7/22 |
| 2016/0377508 | A1 | 12/2016 | Perrone et al. | |
| 2018/0037235 | A1 * | 2/2018 | Otake | ................... B60W 30/12 |
| 2018/0126986 | A1 * | 5/2018 | Kim | ....................... B60K 28/06 |

(Continued)

FOREIGN PATENT DOCUMENTS

| CN | 107074215 A | 8/2017 |
| JP | 2013-082382 A | 5/2013 |

(Continued)

OTHER PUBLICATIONS

Non-Final Office Action dated Jul. 13, 2022 in U.S. Appl. No. 17/722,586.

(Continued)

*Primary Examiner* — Jonathan M Dager
(74) *Attorney, Agent, or Firm* — Oblon, McClelland, Maier & Neustadt, L.L.P.

(57) ABSTRACT

A vehicle is a vehicle on which an autonomous driving kit (ADK) is mountable. The vehicle includes: a vehicle platform (VP) that controls the vehicle in accordance with an instruction from the ADK; and a vehicle control interface that serves as an interface between the ADK and the VP. The VP receives a driver deceleration request in accordance with an amount of depression of a brake pedal by a driver, and receives a system deceleration request from the ADK through the vehicle control interface. During an autonomous mode, the VP specifies the sum of the driver deceleration request and the system deceleration request as a target deceleration of the vehicle.

3 Claims, 18 Drawing Sheets

(56) References Cited

U.S. PATENT DOCUMENTS

| | | | |
|---|---|---|---|
| 2018/0208166 A1* | 7/2018 | Eckert | B60T 8/327 |
| 2018/0299898 A1* | 10/2018 | Luo | G05D 1/0061 |
| 2019/0337503 A1 | 11/2019 | Otremba | |
| 2021/0229697 A1* | 7/2021 | Lee | B60W 50/14 |
| 2021/0245785 A1* | 8/2021 | Suzuki | B60W 60/0059 |
| 2022/0080935 A1* | 3/2022 | Terada | B60T 8/92 |
| 2022/0126845 A1* | 4/2022 | Hsu | B60W 50/0205 |

FOREIGN PATENT DOCUMENTS

| | | | |
|---|---|---|---|
| JP | 2018-132015 A | 8/2018 |
| JP | 2018-527248 A | 9/2018 |
| KR | 10-2019-0017343 A | 2/2019 |
| WO | 2016/158508 A1 | 10/2016 |
| WO | 2019/049269 A1 | 3/2019 |

OTHER PUBLICATIONS

Final Office Action dated Nov. 9, 2022 in U.S. Appl. No. 17/722,586.
Notice of Allowance dated Feb. 1, 2023 in U.S. Appl. No. 17/722,586.

* cited by examiner

FIG.7

| #1: CREATING A DRIVING PLAN | THE ADS CREATES A DRIVING PLAN. |
|---|---|
| #2: EXTRACTING PHYSICAL QUANTITIES | THE ADS EXTRACTS PHYSICAL CONTROL QUANTITIES FROM THE DRIVING PLAN. E.G. PHYSICAL CONTROL QUANTITIES := ACCELERATION, ROAD WHEEL ANGLE, ETC. |
| #3: SPLIT OF PHYSICAL QUANTITIES | THE ADS SPLITS THEM BY DEFINED CYCLE TIME OF EACH API. |
| #4: EXECUTION OF THE API WITH THE VALUE | THE ADS EXECUTES THE API WITH THE SPLIT PHYSICAL QUANTITY. |
| #5: CALCULATION OF ITS BEHAVIOR | THE ADS CALCULATES THE VEHICLE BEHAVIOR, AND RECREATES A DRIVING PLAN THAT THE VEHICLE BEHAVIOR IS REFLECTED TO |

VEHICLE

This nonprovisional application is based on Japanese Patent Application No. 2020-015724 filed on Jan. 31, 2020 with the Japan Patent Office, the entire contents of which are hereby incorporated by reference.

BACKGROUND

Field

The present disclosure relates to a vehicle.

Description of the Background Art

In recent years, development of the autonomous driving technology for vehicles is in progress. Japanese Patent Laying-Open No. 2018-132015 for example discloses an autonomous driving system that conducts centralized autonomous driving control for a vehicle. This autonomous driving system includes a camera, a laser device, a radar device, an operation device, a gradient sensor, autonomous driving equipment, and an autonomous-driving ECU (Electronic Control Unit).

Japanese Patent Laying-Open No. 2018-132015 discloses, in a second modification, that at least one of a motive power function, a braking function, and a steering function of the autonomous driving equipment is restricted (see FIGS. 7 and 8). Such a state where the autonomous control is inhibited is a state that can al so be switched to driver's manual operation.

SUMMARY

The autonomous driving system may be attached externally to the body of the vehicle. In this case, a vehicle platform (described later herein) controls the vehicle in accordance with instructions from the autonomous driving system to thereby implement autonomous driving.

In order for the autonomous driving system and the vehicle platform to work in cooperation with each other appropriately, it is preferable to provide an appropriate interface between the autonomous driving system and the vehicle platform. The importance of such an interface may particularly be high if the developer of the autonomous driving system is different from the developer of the vehicle platform, for example.

The present disclosure is made to solve the above-described problem, and an object of the present disclosure is to provide an appropriate interface between the autonomous driving system and the vehicle platform.

(1) A vehicle according to an aspect of the present disclosure is a vehicle on which an autonomous driving system is mountable. The vehicle includes: a vehicle platform that controls the vehicle in accordance with an instruction from the autonomous driving system; and a vehicle control interface that serves as an interface between the autonomous driving system and the vehicle platform. The vehicle platform receives a first deceleration request in accordance with an amount of depression of a brake pedal by a driver, and receives a second deceleration request from the autonomous driving system through the vehicle control interface. During an autonomous mode, the vehicle platform specifies a sum of the first deceleration request and the second deceleration request as a target deceleration of the vehicle.

(2) The vehicle platform has, as the autonomous mode, a VO (Vehicle Operation) mode that is a control mode in which the driver is aboard the vehicle while the vehicle is capable of autonomous driving, and an NVO (Non-Vehicle Operation) mode that is a control mode in which the vehicle is capable of completely unmanned driving. The vehicle platform specifies the sum as the target deceleration, in either the VO mode or the NVO mode.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 7 is a diagram showing a typical flow in an autonomous driving system.

DESCRIPTION OF THE PREFERRED EMBODIMENTS

Figure 1:
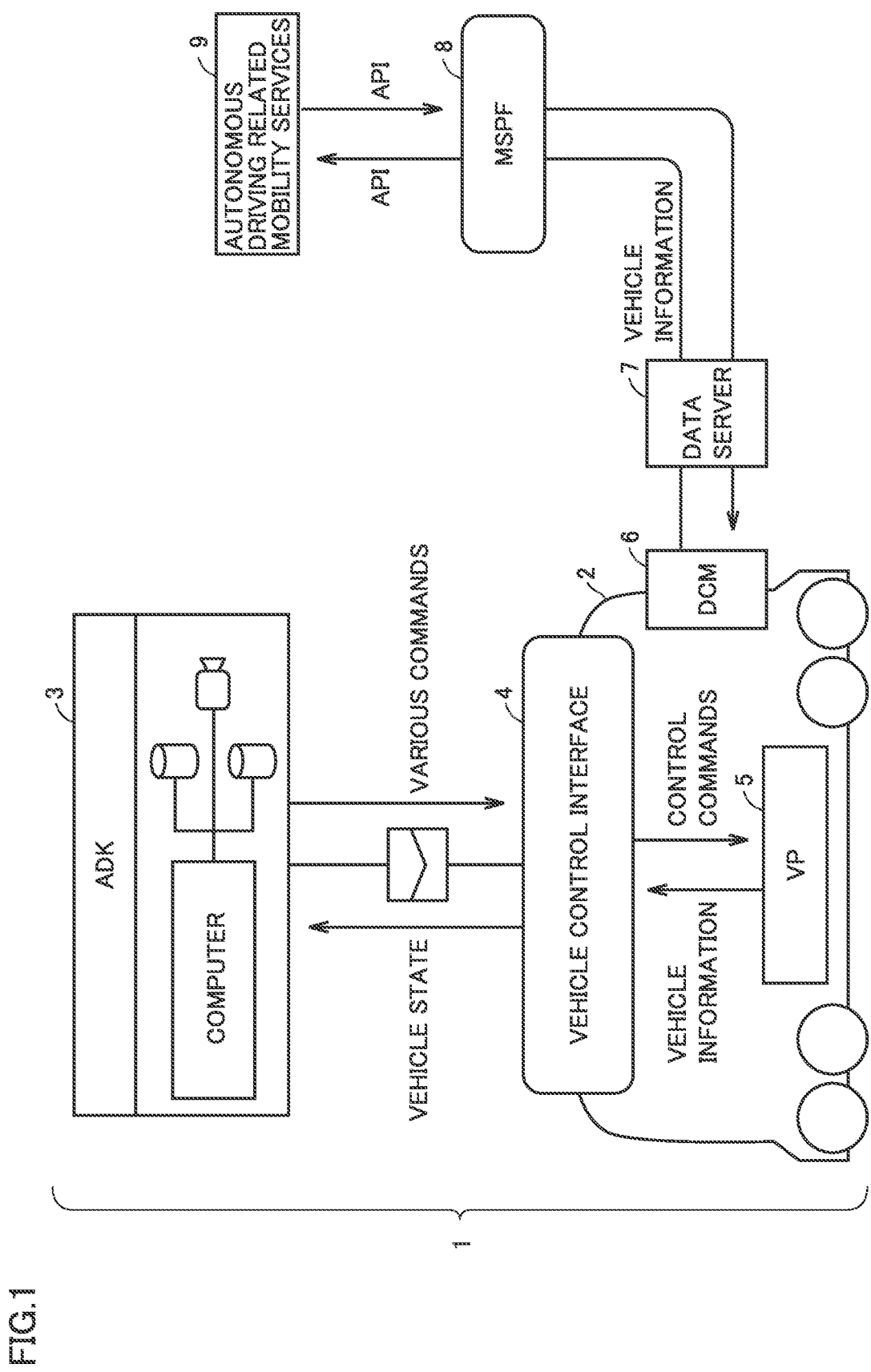
FIG. 1 is a diagram schematically showing a MaaS system in which a vehicle according to an embodiment of the present disclosure is used.

In the following, the present embodiment is described in detail with reference to the drawings. In the drawings, the same or corresponding parts are denoted by the same reference characters, and a description thereof is not repeated.

In connection with the following embodiment, an example is described in which an autonomous driving kit (ADK) is mounted on a MaaS vehicle (Mobility as a Service vehicle). The autonomous driving kit is a tool into which hardware and software for implementing autonomous driving are integrated, and is one form that implements the autonomous driving system (ADS). The type of the vehicle on which the autonomous driving kit can be mounted is not limited to the MaaS vehicle. The autonomous driving kit is applicable to all types of vehicles for which autonomous driving can be implemented.

EMBODIMENT

<Overall Configuration>

FIG. 1 schematically shows a MaaS system in which a vehicle according to an embodiment of the present disclosure is used. Referring to FIG. 1, this MaaS system includes a vehicle 1. Vehicle 1 includes a vehicle main body 2 and an autonomous driving kit (ADK) 3. Vehicle main body 2 includes a vehicle control interface 4, a vehicle platform (VP) 5, and a DCM (Data Communication Module) 6. The MaaS system includes, in addition to vehicle 1, a data server 7, a mobility service platform (MSPF) 8, and autonomous driving related mobility services 9.

Vehicle 1 is capable of autonomous driving in accordance with a command from ADK 3 attached to vehicle main body 2. Although vehicle main body 2 is shown to be located separately from ADK 3 in FIG. 1, actually ADK 3 is attached to a rooftop for example of vehicle main body 2.

ADK 3 can also be detached from vehicle main body 2. While ADK 3 is not attached, vehicle main body 2 can be driven by a driver to travel. In this case, VP 5 conducts travel control (travel control in accordance with driver's operation) in a manual mode.

Vehicle control interface 4 can communicate with ADK 3 through a CAN (Controller Area Network) for example. Vehicle control interface 4 executes a predetermined API (Application Program Interface) defined for each signal to be communicated, to thereby receive various commands from ADK 3 and output the state of vehicle main body 2 to ADK 3.

Receiving a command from ADK 3, vehicle control interface 4 outputs, to VP 5, a control command corresponding to the received command. Vehicle control interface 4 also acquires various types of information about vehicle main body 2 from VP 5 and outputs the state of vehicle main body 2 to ADK 3. A configuration of vehicle control interface 4 is detailed later herein.

VP 5 includes various systems and various sensors for controlling vehicle main body 2. In accordance with a command given from ADK 3 through vehicle control interface 4, VP 5 conducts vehicle control. Specifically, in accordance with a command from ADK 3, VP 5 conducts vehicle control to thereby implement autonomous driving of vehicle 1. A configuration of VP 5 is also detailed later herein.

ADK 3 is a kind of autonomous driving system (ADS) for implementing autonomous driving of vehicle 1. ADK 3 prepares, for example, a driving plan for vehicle 1, and outputs various commands for causing vehicle 1 to travel following the prepared driving plan, to vehicle control interface 4 in accordance with an API defined for each command. ADK 3 also receives various signals indicating the state of vehicle main body 2, from vehicle control interface 4 in accordance with an API defined for each signal, and causes the received vehicle state to be reflected on preparation of the driving plan. A configuration of ADK 3 is also described later herein.

DCM 6 includes a communication interface for vehicle main body 2 to communicate by radio with data server 7. DCM 6 outputs, to data server 7, various types of vehicle information such as speed, position, and state of autonomous driving, for example. DCM 6 also receives, from autonomous driving related mobility services 9 through MSPF 8 and data server 7, various types of data for managing travel of autonomous vehicles including vehicle 1 for autonomous driving related mobility services 9, for example.

Data server 7 is configured to communicate by radio with various autonomous vehicles including vehicle 1, and configured to communicate also with MSPF 8. Data server 7 stores various types of data (data regarding the vehicle state and the vehicle control) for managing travel of the autonomous vehicle.

MSPF 8 is an integrated platform to which various mobility services are connected. In addition to autonomous driving related mobility services 9, various mobility services that are not shown (for example, various mobility services provided by a ridesharing company, a car-sharing company, an insurance company, a rent-a-car company, a taxi company, and the like) may be connected to MSPF 8. Various mobility services including mobility services 9 can use various functions provided by MSPF 8 appropriately for respective services, using an API published on MSPF 8.

Autonomous driving related mobility services 9 provide mobility services using autonomous vehicles including vehicle 1. Using an API published on MSPF 8, mobility services 9 can acquire, from MSPF 8, drive control data for vehicle 1 communicating with data server 7 and/or information or the like stored in data server 7, for example. Using the above-described API, mobility services 9 also transmit, to MSPF 8, data or the like for managing autonomous vehicles including vehicle 1, for example.

MSPF 8 publishes APIs for using various types of data regarding the vehicle state and the vehicle control necessary for development of the ADS. ADS companies can use, as the API, data regarding the vehicle state and the vehicle control necessary for development of the ADS, stored in data server 7.

<Vehicle Configuration>

Figure 2:
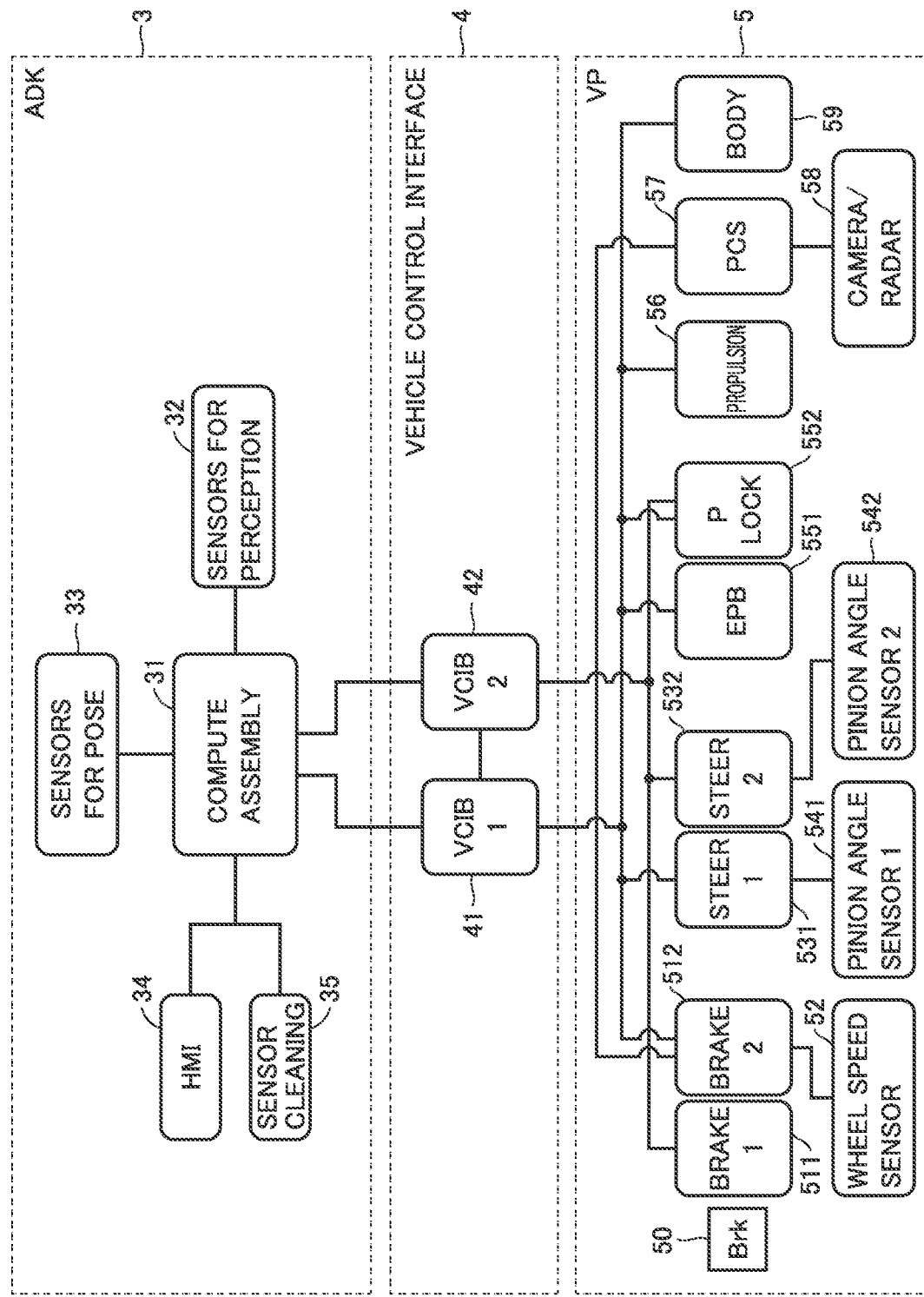
FIG. 2 is a diagram showing a configuration of the vehicle in more detail.

FIG. 2 shows a configuration of vehicle 1 in more detail. Referring to FIG. 2, ADK 3 includes a compute assembly 31, sensors for perception 32, sensors for pose 33, an HMI (Human Machine Interface) 34, and sensor cleaning 35.

During autonomous driving of vehicle 1, compute assembly 31 uses various sensors (described later herein) to obtain the environment around the vehicle, as well as pose, behavior, and position of vehicle 1. Compute assembly 31 also obtains the state of vehicle 1 from VP 5 through vehicle control interface 4, and determines the next operation (acceleration, deceleration, turn, or the like) of vehicle 1. Compute assembly 31 outputs, to vehicle control interface 4, a command for implementing the determined next operation.

Sensors for perception 32 perceive the environment around the vehicle. Specifically, sensors for perception 32 include at least one of a LIDAR (Light Detection and Ranging), a millimeter-wave radar, and a camera, for example.

The LIDAR illuminates a target (human, another vehicle, or obstacle, for example) with infrared pulsed laser light, and measures the distance to the target based on the time taken for the light to be reflected from the target and return to the LIDAR. The millimeter-wave radar applies millimeter wave to the target and detects the millimeter wave reflected from the target to measure the distance to the target and/or the direction of the target. The camera is placed on the back side of a room mirror in the vehicle compartment, for example, to take a picture of an area located forward of vehicle 1. The image taken by the camera can be subjected to image processing by an image processor equipped with artificial intelligence (AI). The information obtained by sensors for perception 32 is output to compute assembly 31.

Sensors for pose 33 detect the pose, the behavior, and the position of vehicle 1. Specifically, sensors for pose 33 include an inertial measurement unit (IMU) and a GPS (Global Positioning System), for example.

The IMU detects, for example, the deceleration of vehicle 1 in the longitudinal direction, the transverse direction, and the vertical direction, as well as the angular velocity of vehicle 1 in the roll direction, the pitch direction, and the yaw direction. The GPS uses information received from a plurality of GPS satellites orbiting around the earth to detect the position of vehicle 1. The information acquired by sensors for pose 33 is also output to compute assembly 31.

HMI 34 includes, for example, a display device, an audio output device, and an operation device. Specifically, HMI 34 may include a touch panel display and/or a smart speaker (AI speaker). During autonomous driving of vehicle 1, during driving in the manual mode, or during mode transition, for example, HMI 34 provides information to a user or receives user's operation.

Sensor cleaning 35 is configured to remove dirt stuck to each sensor. More specifically, sensor cleaning 35 removes dirt on a camera lens, a laser emission part or a millimeter-wave emission part, for example, with a cleaning liquid or wiper, for example.

Vehicle control interface 4 includes a vehicle control interface box (VCIB) 41 and a VCIB 42. VCIBs 41, 42 each include therein, a processor such as CPU (Central Processing Unit), and a memory such as ROM (Read Only Memory) and RAM (Random Access Memory). Each of VCIB 41 and VCIB 42 is connected communicatively to compute assembly 31 of ADK 3. VCIB 41 and VCIB 42 are connected to be capable of communicating with each other.

Each of VCIB 41 and VCIB 42 relays various commands from ADK 3 and outputs each relayed command as a control command to VP 5. More specifically, each of VCIB 41 and VCIB 42 uses a program or the like stored in the memory to convert various commands that are output from ADK 3 into control commands to be used for controlling each system of VP 5, and outputs the control commands to a system to which it is connected. Moreover, each of VCIB 41 and VCIB 42 performs appropriate processing (including relaying) on the vehicle information that is output from VP 5, and outputs the resultant information as vehicle information to ADK 3.

Although VCIB 41 and VCIB 42 differ from each other in terms of some of constituent parts of VP 5 to which VCIB 41 and VCIB 42 are connected, basically they have equivalent functions. VCIB 41 and VCIB 42 have equivalent functions regarding operation of the brake system and operation of the steering system for example, so that the control system between ADK 3 and VP 5 is made redundant (duplicated). Therefore, even when some fault occurs to a part of the systems, the control system can be switched or the control system to which the fault has occurred can be interrupted, for example, to maintain the functions (such as steering and braking) of VP 5.

VP 5 includes a brake pedal 50, brake systems 511, 512, a wheel speed sensor 52, steering systems 531, 532, pinion angle sensors 541, 542, an EPB (Electric Parking Brake) system 551, a P (parking) lock system 552, a propulsion system 56, a PCS (Pre-Crash Safety) system 57, a camera/radar 58, and a body system 59.

VCIB 41 is connected communicatively with brake system 512, steering system 531, and P lock system 552, among a plurality of systems of VP 5 (namely EPB 551, propulsion system 56 and body system 59), through a communication bus. VCIB 42 is connected communicatively with brake system 511, steering system 532, and P lock system 552, through a communication bus.

Brake pedal 50 receives driver's operation (depression). Brake pedal 50 is equipped with a brake position sensor (not shown) that detects the amount of depression by which brake pedal 50 is depressed.

Brake systems 511, 512 are configured to control a plurality of braking devices (not shown) provided for respective wheels of vehicle 1. These braking devices may include a disc brake system that operates using hydraulic pressure regulated by an actuator. Brake system 511 and brake system 512 may be configured to have equivalent functions. Alternatively, one of brake systems 511, 512 may be configured to control the braking force for each wheel independently while the vehicle is running, and the other may be configured to control the braking force so that the same braking force is generated for each wheel while the vehicle is running.

In accordance with a predetermined control command transmitted from ADK 3 through vehicle control interface 4, each of brake systems 511, 512 generates a braking command for the braking device. Moreover, brake systems 511, 512 control the braking device, using the braking command generated by one of brake systems 511, 512, for example. Further, when a failure occurs to one of brake systems 511, 512, the braking command generated by the other is used to control the braking device.

Wheel speed sensor 52 is connected to brake system 512 in this example. Wheel speed sensor 52 is mounted on each wheel of vehicle 1, for example. Wheel speed sensor 52 detects the rotational speed of the wheel and outputs the detected rotational speed to brake system 512. Brake system 512 outputs, to VCIB 41, the rotational speed of each wheel, as an information item among information items included in the vehicle information.

Steering systems 531, 532 are configured to control the steering angle of the steering wheel of vehicle 1, using a steering device (not shown). The steering device includes, for example, a rack-and-pinion EPS (Electric Power Steering) system capable of adjusting the steering angle by an actuator.

Steering system 531 and steering system 532 have equivalent functions. Each of steering systems 531, 532 generates a steering command for the steering device in accordance with a predetermined control command that is output from ADK 3 through vehicle control interface 4. Using the steering command generated by one of steering systems 531, 532, for example, steering systems 531, 532 control the steering device. When a failure occurs to one of steering systems 531, 532, the steering commend generated by the other steering system is used to control the steering device.

Pinion angle sensor 541 is connected to steering system 531. Pinion angle sensor 542 is connected to steering system 532. Each of pinion angle sensors 541, 542 detects the rotational angle (pinon angle) of a pinion gear coupled to the rotational shaft of the actuator, and outputs the detected pinion angle to the associated steering system 531, 532.

EPB system 551 is configured to control an EPB provided in a wheel of vehicle 1. The EPB is provided separately from the braking device of brake systems 511, 512, and fixes the wheel by an operation of an actuator. This actuator may be capable of regulating the hydraulic pressure to be applied to the braking device, separately from brake systems 511, 512. The EPB fixes a wheel by actuating, with the actuator, a drum brake for a parking brake, for example.

P lock system 552 is configured to control a P lock device (not shown) provided for the transmission of vehicle 1. More specifically, a gear (lock gear) is provided to be coupled to a rotational element in the transmission. Further, a parking lock pole capable of adjusting the position by an actuator is also provided for a teeth portion of the lock gear. The P lock device fits a protrusion located on the head of the parking lock pole to thereby fix rotation of the output shaft of the transmission.

Propulsion system 56 is capable of switching the shift range using a shift device (not shown), and capable of controlling the driving force for vehicle 1 in the direction of travel, using a drive source (not shown). The shift device is configured to select a shift range from a plurality of shift ranges. The drive source may include a motor generator and an engine, for example.

PCS system 57 conducts control for avoiding collision of vehicle 1 and/or reducing damages to vehicle 1, using camera/radar 58. More specifically, PCS system 57 is connected to brake system 512. PCS system 57 uses camera/radar 58 to detect a forward object, and determines whether there is a possibility of collision of vehicle 1 against the object, based on the distance to the object. When PCS system 57 determines that there is a possibility of collision, PCS system 57 outputs a braking command to brake system 512 so as to increase the braking force.

Body system 59 is configured to control various constituent parts (direction indicator, horn or wiper, for example), depending on the running state or the running environment of vehicle 1, for example.

Systems other than brake systems 511, 512 and steering systems 531, 532 are also configured to control respective associated devices, in accordance with a predetermined control command transmitted from ADK 3 through vehicle control interface 4. Specifically, EPB system 551 receives a control command from ADK 3 through vehicle control interface 4, and controls the EPB in accordance with the control command. P lock system 552 receives a control command from ADK 3 through vehicle control interface 4, and controls the P lock device in accordance with the control command. Propulsion system 56 receives a control command from ADK 3 through vehicle control interface 4, and controls the shift device and the drive source, in accordance with the control command. Body system 59 receives a control command from ADK 3 through vehicle control interface 4, and controls the aforementioned constituent parts in accordance with the control command.

For the above-described braking device, steering device, EPB, P lock, shift device, and drive source, for example, an operation device that enables a user to perform manual operation may be provided separately.

<Brake Pedal Control>

Figure 3:
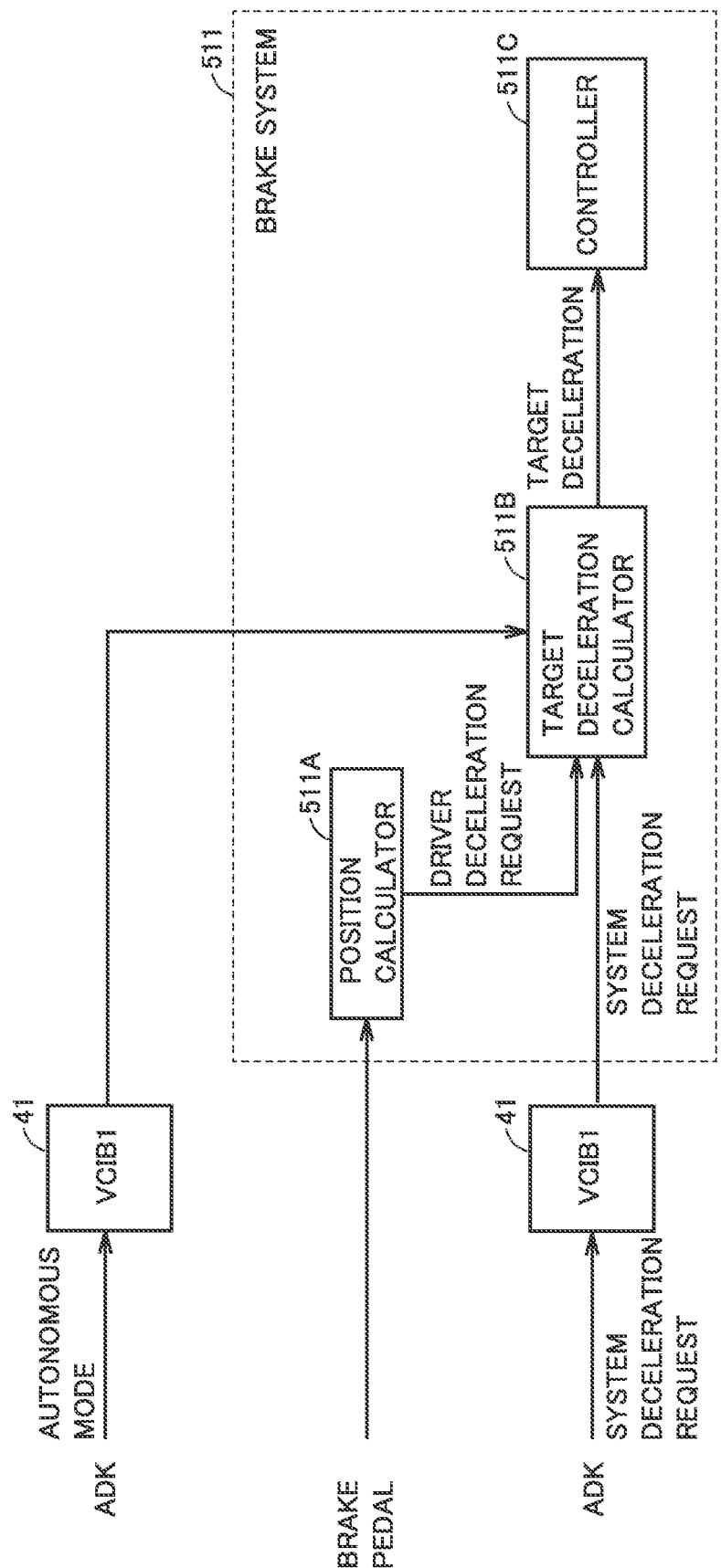
FIG. 3 is a functional block diagram regarding brake pedal control for a vehicle.

FIG. 3 is a functional block diagram regarding brake pedal control for vehicle 1. Referring to FIGS. 2 and 3, brake system 511 includes a position calculator 511A, a target deceleration calculator 511B, and a controller 511C. Although brake system 511 is described by way of example on account of limited space herein, brake system 512 may have similar functions to brake system 511.

Position calculator 511A receives, from the brake position sensor (not shown), a signal indicating an amount of depression of brake pedal 50 by a driver, and outputs, to target deceleration calculator 511B, a deceleration request in accordance with the amount of depression of brake pedal 50. This deceleration request is hereinafter referred to as "driver deceleration request." The driver deceleration request corresponds to "first deceleration request" of the present disclosure.

ADK 3 outputs a deceleration request to brake system 511 through VCIB 41. This deceleration request is hereinafter referred to as "system deceleration request." The system deceleration request corresponds to "second deceleration request" of the present disclosure.

The source of the system deceleration request is not limited to ADK 3, but may be PCS system 57, for example. Moreover, ADK 3 and/or PCS system 57 may output the system deceleration request to brake system 511 through the other VCIB 42 provided for redundancy.

Target deceleration calculator 511B receives, from ADK 3 through VCIB 41, an autonomous driving instruction that instructs transition to an autonomous mode. Target deceleration calculator 511B also receives the driver deceleration request from position calculator 511A and receives the system deceleration request from ADK 3 through VCIB 41. During the autonomous mode, target deceleration calculator 511B calculates the sum of the driver deceleration request and the system deceleration request, and outputs the sum, as a target deceleration of vehicle 1, to controller 511C.

Controller 511C controls each of the systems (brake systems 511, 512 and propulsion system 56, for example) included in VP 5, in accordance with the target deceleration from target deceleration calculator 511B. Thus, braking control of vehicle 1 is conducted so as to make the deceleration of vehicle 1 closer to the target deceleration.

<Control Flow>

Figure 4:
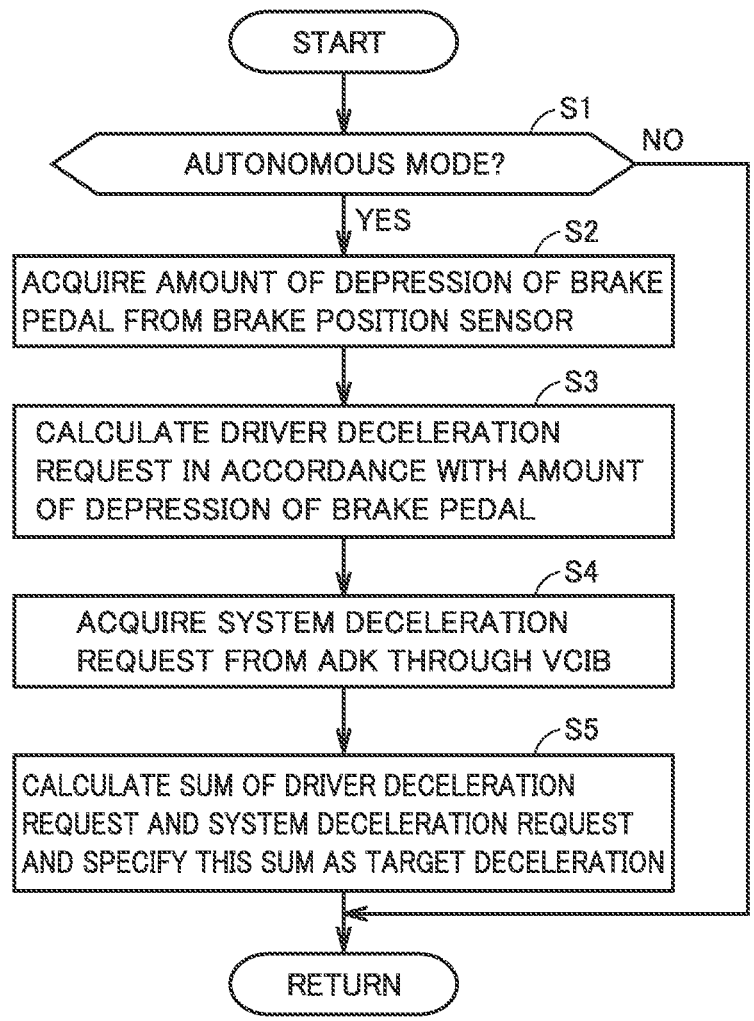
FIG. 4 is a flowchart showing braking control during an autonomous mode of a vehicle.

FIG. 4 is a flowchart showing braking control during the autonomous mode of vehicle 1. The process of the flowchart is performed for each elapse of a predetermined control period, for example. Although each step included in this flowchart is implemented basically by software processing by VP 5, it may also be implemented by dedicated hardware (electrical circuitry) fabricated in VP 5. The step is abbreviated as "S" herein.

Referring to FIG. 4, in S1, VP 5 determines whether VP 5 is in the autonomous mode or not. VP 5 has at least a VO (Vehicle Operation) mode and an NVO (Non Vehicle Operation) mode as the autonomous mode. The VO mode refers to a control mode in a situation where a driver is aboard vehicle 1 although vehicle 1 is capable of autonomous driving. The NVO mode refers to a control mode in a situation where vehicle 1 is capable of completely unmanned driving. VP 5 can therefore determine that the VP5 is in the autonomous mode, when the VP 5 is in the VO mode or the NVO mode following an autonomous driving instruction from ADK 3. When VP 5 is in the autonomous mode (YES in S1), VP 5 causes the process to proceed to S2. When the VP 5 is not in the autonomous mode (NO in S1), i.e., VP 5 is in a manual mode, VP 5 causes the process to return to the main routine.

In S2, VP 5 acquires an amount of depression of the brake pedal indicated by the brake pedal position signal. The amount of depression of the brake pedal is represented by a value in a range from 0% to 100%. It should be noted that the amount of depression of the brake pedal may exceed 100%, due to an assembly error of the brake pedal and/or the brake position sensor.

In S3, VP 5 calculates the driver deceleration request in accordance with the amount of depression of the brake pedal. It should be noted that the driver deceleration request may be calculated based on a change, per unit time, of the amount of depression of the brake pedal, rather than based on the amount of depression of the brake pedal.

In S4, VP 5 acquires the system deceleration request from a system that may be ADK 3, for example, through VCIB 41 (may alternatively be VCIB 42).

In S5, VP 5 calculates the sum of the driver deceleration request calculated in S2 and the system deceleration request acquired in S3. VP 5 specifies the sum as a target deceleration. Then, VP 5 controls systems that may be brake systems 511, 512 and propulsion system 56, for example, so as to achieve the target deceleration.

As seen from the foregoing, the present embodiment provides vehicle control interface 4 that serves as an interface between ADK 3 and VP 5. Thus, the system deceleration request from ADK 3 is transmitted to VP 5 through vehicle control interface 4 (VCIB 41, 42). It is therefore possible for the developer of ADK 3 to cause ADK 3 to perform communication following a procedure and a data format (APT) for example that are defined for vehicle control interface 4, so that ADK 3 and VP 5 work in cooperation with each other, even when the developer does not have knowledge about details of the specification of VP 5. According to the present embodiment, an appropriate interface can accordingly be provided between ADK 3 and VP 5.

Example 1

Toyota's MaaS Vehicle Platform
API Specification
for ADS Developers
[Standard Edition #0.1]
History of Revision

TABLE 1

| Date of Revision | ver. | Summary of Revision | Reviser |
|---|---|---|---|
| 2019 May 4 | 0.1 | Creating a new material | MaaS Business Div. |

Index
1. Outline 4
1.1. Purpose of this Specification 4
1.2. Target Vehicle 4
1.3. Definition of Term 4
1.4. Precaution for Handling 4
2. Structure 5
2.1. Overall Structure of MaaS 5
2.2. System structure of MaaS vehicle 6
3. Application Interfaces 7
3.1. Responsibility sharing of when using APIs 7
3.2. Typical usage of APIs 7
3.3. APIs for vehicle motion control 9
   3.3.1. Functions 9
   3.3.2. Inputs 16
   3.3.3. Outputs 23
3.4. APIs for BODY control 45
   3.4.1. Functions 45
   3.4.2. Inputs 45
   3.4.3. Outputs 56
3.5. APIs for Power control 68
   3.5.1. Functions 68
   3.5.2. Inputs 68
   3.5.3. Outputs 69
3.6. APIs for Safety 70
   3.6.1. Functions 70
   3.6.2. Inputs 70
   3.6.3. Outputs 70
3.7. APIs for Security 74
   3.7.1. Functions 74
   3.7.2. Inputs 74
   3.7.3. Outputs 76
3.8. APIs for MaaS Service 80
   3.8.1. Functions 80
   3.8.2. Inputs 80
   3.8.3. Outputs 80

1. Outline 1.1. Purpose of this Specification

This document is an API specification of Toyota Vehicle Platform and contains the outline, the usage and the caveats of the application interface.

1.2. Target Vehicle e-Palette, MaaS vehicle based on the POV (Privately Owned Vehicle) manufactured by Toyota 1.3. Definition of Term

TABLE 2

| Term | Definition |
|---|---|
| ADS | Autonomous Driving System. |
| ADK | Autonomous Driving Kit |
| VP | Vehicle Platform. |
| VCIB | Vehicle Control Interface Box. This is an ECU for the interface and the signal converter between ADS and Toyota VP's sub systems. |

1.4. Precaution for Handling

This is an early draft of the document.
All the contents are subject to change. Such changes are notified to the users. Please note that some parts are still T.B.D. will be updated in the future.

2. Structure 2.1. Overall Structure of MaaS

Figure 5:
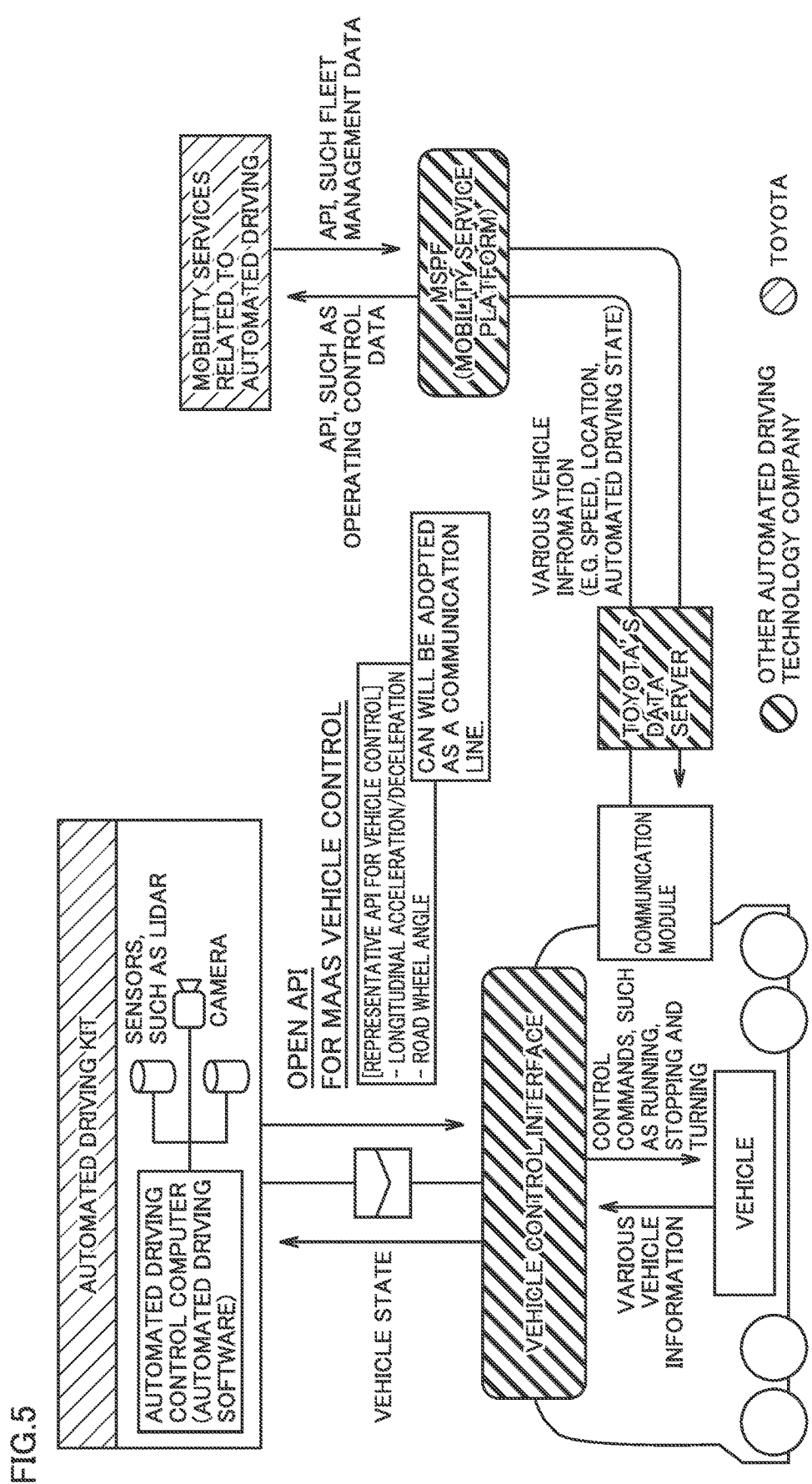
FIG. 5 is a diagram of an overall configuration of MaaS.

The overall structure of MaaS with the target vehicle is shown (FIG. 5).
Vehicle control technology is being used as an interface for technology providers.
Technology providers can receive open API such as vehicle state and vehicle control, necessary for development of automated driving systems.

2.2. System Structure of MaaS Vehicle

Figure 6:
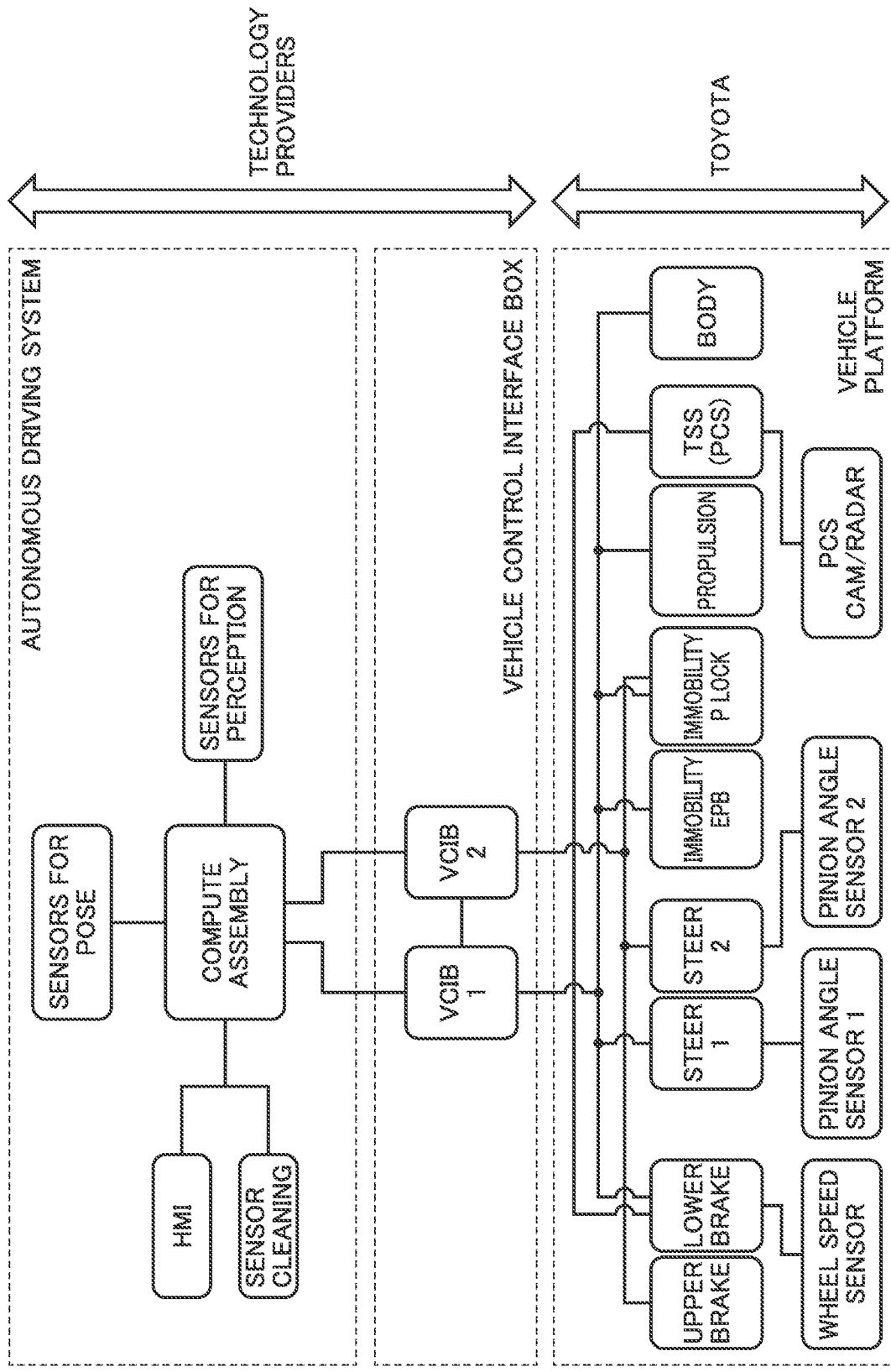
FIG. 6 is a diagram of a system configuration of a MaaS vehicle.

The system architecture as a premise is shown (FIG. 6).
The target vehicle will adopt the physical architecture of using CAN for the bus between ADS and VCIB. In order to realize each API in this document, the CAN frames and the bit assignments are shown in the form of "bit assignment table" as a separate document.

3. Application Interfaces 3.1. Responsibility Sharing of when Using APIs

Basic responsibility sharing between ADS and vehicle VP is as follows when using APIs.

[ADS]

The ADS should create the driving plan, and should indicate vehicle control values to the VP.

[VP]

The Toyota VP should control each system of the VP based on indications from an ADS.

3.2. Typical Usage of APIs

In this section, typical usage of APIs is described.

CAN will be adopted as a communication line between ADS and VP. Therefore, basically, APIs should be executed every defined cycle time of each API by ADS.

A typical workflow of ADS of when executing APIs is as follows (FIG. 7).

3.3. APIs for Vehicle Motion Control

In this section, the APIs for vehicle motion control which is controllable in the MaaS vehicle is described.

3.3.1. Functions

3.3.1.1. Standstill, Start Sequence

The transition to the standstill (immobility) mode and the vehicle start sequence are described. This function presupposes the vehicle is in Autonomy_State=Autonomous Mode. The request is rejected in other modes.

The below diagram shows an example.

Acceleration Command requests deceleration and stops the vehicle. Then, when Longitudinal_Velocity is confirmed as 0 [km/h], Standstill Command="Applied" is sent. After the brake hold control is finished, Standstill Status becomes "Applied". Until then, Acceleration Command has to continue deceleration request. Either Standstill Command="Applied" or Acceleration Command's deceleration request were canceled, the transition to the brake hold control will not happen. After that, the vehicle continues to be standstill as far as Standstill Command="Applied" is being sent. Acceleration Command can be set to 0 (zero) during this period.

Figure 8:
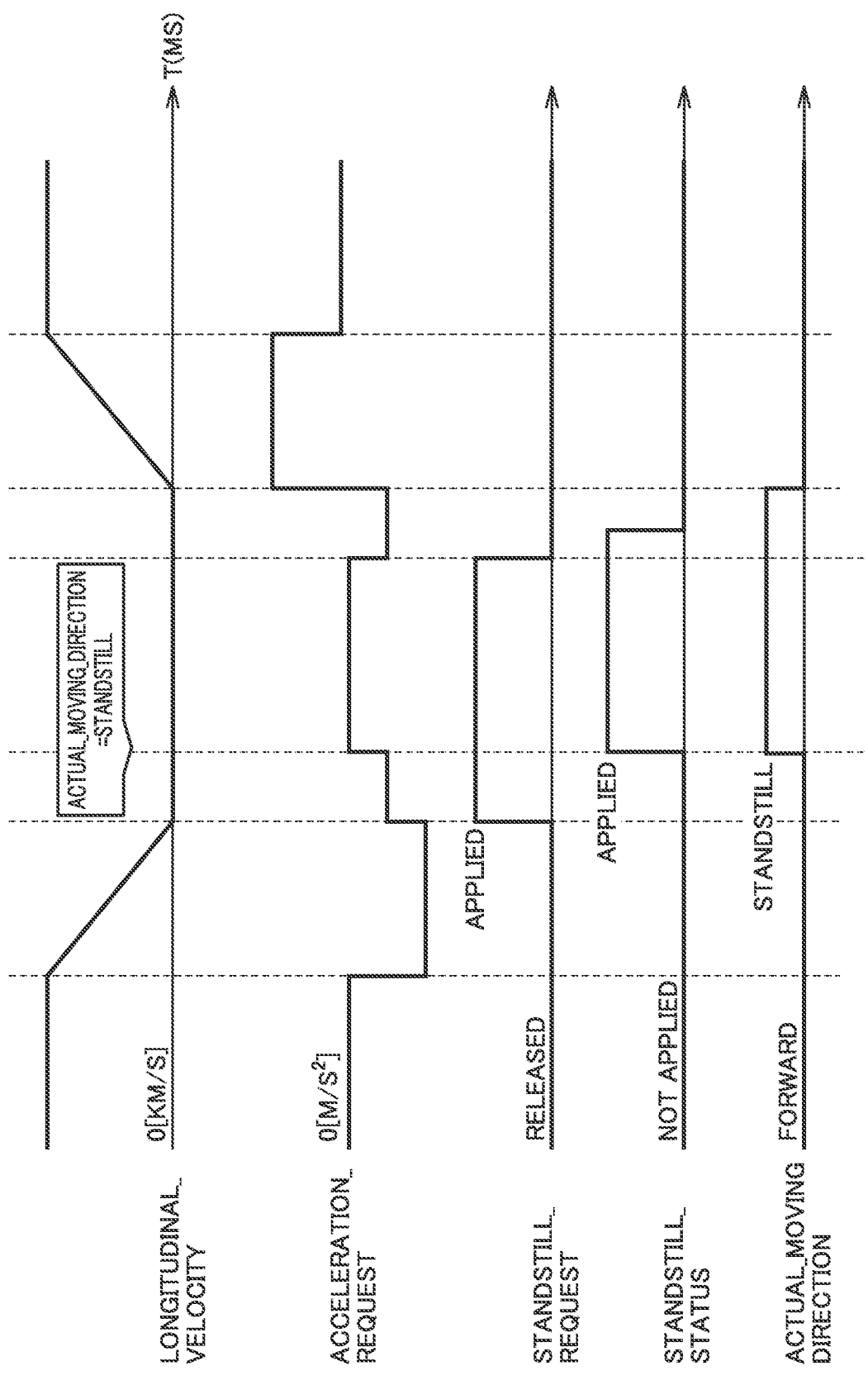
FIG. 8 is a diagram showing an exemplary timing chart of an API relating to stop and start of the MaaS vehicle.

If the vehicle needs to start, the brake hold control is cancelled by setting Standstill Command to "Released". At the same time, acceleration/deceleration is controlled based on Acceleration Command (FIG. 8).

EPB is engaged when Standstill Status="Applied" continues for 3 minutes.

3.3.1.2. Direction Request Sequence

The shift change sequence is described. This function presupposes that Autonomy_State=Autonomous Mode. Otherwise, the request is rejected.

Shift change happens only during Actual_Moving_Direction="standstill"). Otherwise, the request is rejected.

In the following diagram shows an example. Acceleration Command requests deceleration and makes the vehicle stop. After Actual_Moving_Direction is set to "standstill", any shift position can be requested by Propulsion Direction Command. (In the example below, "D"→"R").

During shift change, Acceleration Command has to request deceleration.

Figure 9:
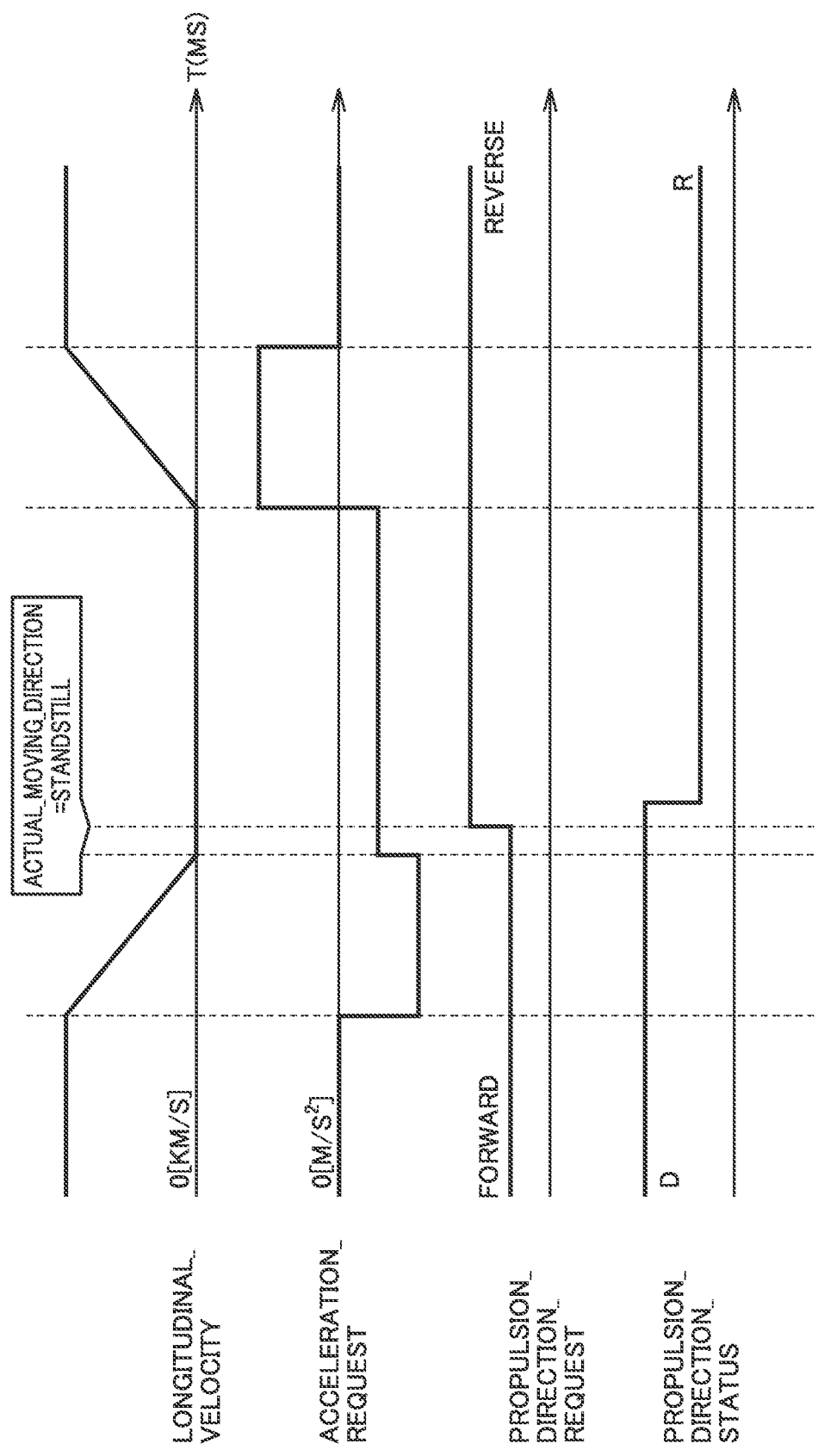
FIG. 9 is a diagram showing an exemplary timing chart of the API relating to shift change of the MaaS vehicle.

After the shift change, acceleration/deceleration is controlled based on Acceleration Command value (FIG. 9).

3.3.1.3. WheelLock Sequence

The engagement and release of wheel lock is described. This function presupposes Autonomy_State=Autonomous Mode, otherwise the request is rejected.

This function is conductible only during vehicle is stopped. Acceleration Command requests deceleration and makes the vehicle stop. After Actual_Moving_Direction is set to "standstill", WheelLock is engaged by Immobilization Command="Applied". Acceleration Command is set to Deceleration until Immobilization Status is set to "Applied".

If release is desired, Immobilization Command="Release" is requested when the vehicle is stationary. Acceleration Command is set to Deceleration at that time.

Figure 10:
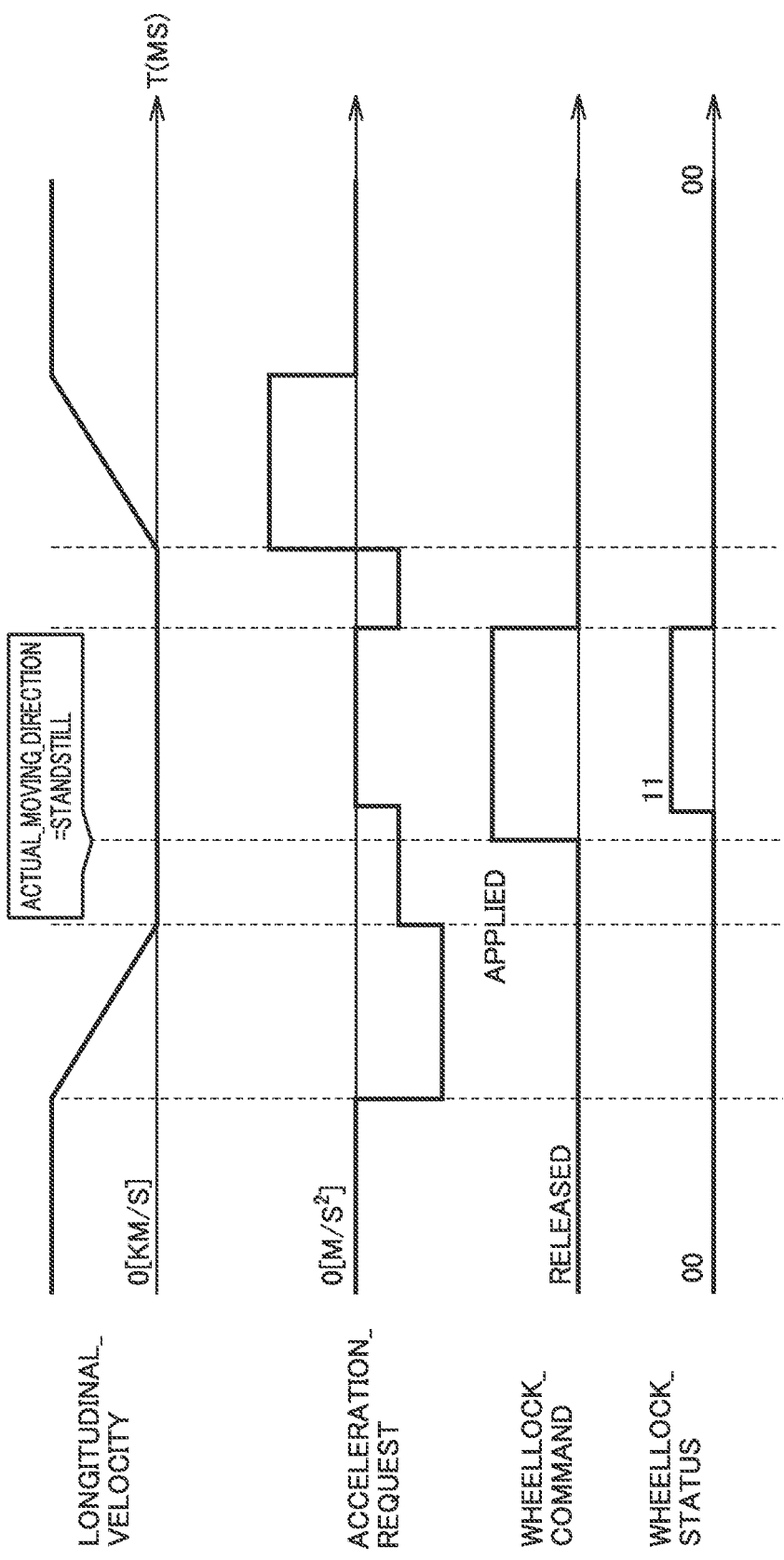
FIG. 10 is a diagram showing an exemplary timing chart of the API relating to wheel lock of the MaaS vehicle.

After this, the vehicle is accelerated/decelerated based on Acceleration Command value (FIG. 10).

3.3.1.4. Road_Wheel_Angle Request

This function presupposes Autonomy_State="Autonomous Mode", and the request is rejected otherwise.

Tire Turning Angle Command is the relative value from Estimated_Road_Wheel_Angle_Actual.

For example, in case that Estimated_Road_Wheel_Angle_Actual=0.1 [rad] while the vehicle is going straight;

If ADS requests to go straight ahead, Tire Turning Angle Command should be set to 0+0.1=0.1 [rad].

If ADS requests to steer by −0.3 [rad], Tire Turning Angle Command should be set to −0.3+0.1=−0.2 [rad].

3.3.1.5. Rider Operation

3.3.1.5.1. Acceleration Pedal Operation

While in Autonomous driving mode, accelerator pedal stroke is eliminated from the vehicle acceleration demand selection.

3.3.1.5.2. Brake Pedal Operation

The action when the brake pedal is operated. In the autonomy mode, target vehicle deceleration is the sum of 1) estimated deceleration from the brake pedal stroke and 2) deceleration request from AD system.

3.3.1.5.3. Shift_Lever_Operation

In Autonomous driving mode, driver operation of the shift lever is not reflected in Propulsion Direction Status.

If necessary, ADS confirms Propulsion Direction by Driver and changes shift position by using Propulsion Direction Command.

3.3.1.5.4. Steering Operation

When the driver (rider) operates the steering, the maximum is selected from 1) the torque value estimated from driver operation angle, and 2) the torque value calculated from requested wheel angle.

Note that Tire Turning Angle Command is not accepted if the driver strongly turns the steering wheel. The above-mentioned is determined by Steering_Wheel_Intervention flag.

3.3.2. Inputs

TABLE 3

| Signal Name | Description | Redundancy |
| --- | --- | --- |
| Propulsion Direction Command | Request to switch between forward (D range) and back (R range) | N/A |
| Immobilization Command | Request to engage/release WheelLock | Applied |
| Standstill Command | Request to maintain stationary | Applied |
| Acceleration Command | Request to accelerate/decelerate | Applied |
| Tire Turning Angle Command | Request front wheel angle | Applied |
| Autonomization Command | Request to transition between manual mode and autonomy mode | Applied |

3.3.2.1. Propulsion Direction Command

Request to switch between forward (D range) and back (R range)
Values

TABLE 4

| value | Description | Remarks |
| --- | --- | --- |
| 0 | No Request | |
| 2 | R | Shift to R range |
| 4 | D | Shift to D range |
| other | Reserved | |

Remarks
Only available when Autonomy_State="Autonomous Mode"
D/R is changeable only the vehicle is stationary (Actual_Moving_Direction="standstill").
The request while driving (moving) is rejected.
When system requests D/R shifting, Acceleration Command is sent deceleration (−0.4 m/s²) simultaneously. (Only while brake is applied.)
The request may not be accepted in following cases.
Direction_Control_Degradation_Modes="Failure detected"

3.3.2.2. Immobilization Command

Request to engage/release WheelLock
Values

TABLE 5

| value | Description | Remarks |
| --- | --- | --- |
| 0 | No Request | |
| 1 | Applied | EPB is turned on and TM shifts to P range |
| 2 | Released | EPB is turned off and TM shifts to the value of Propulsion Direction Command |

Remarks
Available only when Autonomy_State="Autonomous Mode"
Changeable only when the vehicle is stationary (Actual_Moving_Direction="standstill")
The request is rejected when vehicle is running.
When Apply/Release mode change is requested, Acceleration Command is set to deceleration (−0.4 m/s²). (Only while brake is applied.)

3.3.2.3. Standstill Command

Request the vehicle to be stationary
Values

TABLE 6

| value | Description | Remarks |
| --- | --- | --- |
| 0 | No Request | |
| 1 | Applied | Standstill is requested |
| 2 | Released | |

Remarks
Only available when Autonomy_State="Autonomous Mode"
Confirmed by Standstill Status="Applied"
When the vehicle is stationary (Actual_Moving_Direction="standstill"), transition to Stand Still is enabled.
Acceleration Command has to be continued until Standstill Status becomes "Applied" and Acceleration Command's deceleration request (−0.4 m/s²) should be continued.
There are more cases where the request is not accepted. Details are T.B.D.

3.3.2.4. Acceleration Command

Command vehicle acceleration
Values
Estimated_Max_Decel_Capability to Estimated_Max_Accel_Capability [m/s²]
Remarks
Only available when Autonomy_State="Autonomous Mode"
Acceleration (+) and deceleration (−) request based on Propulsion Direction Status direction
The upper/lower limit will vary based on Estimated_Max_Decel_Capability and Estimated_Max_Accel_Capability.
When acceleration more than Estimated_Max_Accel_Capability is requested, the request is set to Estimated_Max_Accel_Capability.
When deceleration more than Estimated_Max_Decel_Capability is requested, the request is set to Estimated_Max_Decel_Capability.
Depending on the accel/brake pedal stroke, the requested acceleration may not be met. See 3.4.1.4 for more detail.
When Pre-Collision system is activated simultaneously, minimum acceleration (maximum deceleration) is selected.

3.3.2.5. Tire Turning Angle Command

Command tire turning angle
Values

TABLE 7

| value | Description | Remarks |
| --- | --- | --- |
| — | [unit: rad] | |

Remarks
Left is positive value (+). Right is negative value (−).
Available only when Autonomy_State="Autonomous Mode"
The output of Estimated_Road_Wheel_Angle_Actual when the vehicle is going straight, is set to the reference value (0).
This requests relative value of Estimated_Road_Wheel_Angle_Actual. (See 3.4.1.1 for details)
The requested value is within Current_Road_Wheel_Angle_Rate_Limit.
The requested value may not be fulfilled depending on the steer angle by the driver.

3.3.2.6. Autonomization Command

Request to transition between manual mode and autonomy mode

Values

TABLE 8

| value | Description | Remarks |
|---|---|---|
| 00b | No Request For Autonomy | |
| 01b | Request For Autonomy | |
| 10b | Deactivation Request | means transition request to manual mode |

The mode may be able not to be transitioned to Autonomy mode. (e.g. In case that a failure occurs in the vehicle platform.)

3.3.3. Outputs

TABLE 9

| Signal Name | Description | Redundancy |
|---|---|---|
| Propulsion Direction Status | Current shift range | N/A |
| Propulsion Direction by Driver | Shift lever position by driver | N/A |
| Immobilization Status | Output of EPB and Shift P | Applied |
| Immobilization Request by Driver | EPB switch status by driver | N/A |
| Standstill Status | Stand still status | N/A |
| Estimated_Coasting_Rate | Estimated vehicle deceleration when throttle is closed | N/A |
| Estimated_Max_Accel_Capability | Estimated maximum acceleration | Applied |
| Estimated_Max_Decel_Capability | Estimated maximum deceleration | Applied |
| Estimated_Road_Wheel_Angle_Actual | Front wheel steer angle | Applied |
| Estimated_Road_Wheel_Angle_Rate_Actual | Front wheel steer angle rate | Applied |
| Steering_Wheel_Angle_Actual | Steering wheel angle | N/A |
| Steering_Wheel_Angle_Rate_Actual | Steering wheel angle rate | N/A |
| Current_Road_Wheel_Angle_Rate_Limit | Road wheel angle rate limit | Applied |
| Estimated_Max_Lateral_Acceleration_Capability | Estimated max lateral acceleration | Applied |
| Estimated_Max_Lateral_Acceleration_Rate_Capability | Estimated max lateral acceleration rate | Applied |
| Accelerator_Pedal_Position | Position of the accelerator pedal (How much is the pedal depressed?) | N/A |
| Accelerator_Pedal_Intervention | This signal shows whether the accelerator pedal is depressed by a driver (intervention) | N/A |
| Brake_Pedal_Position | Position of the brake pedal (How much is the pedal depressed?) | T.B.D. |
| Brake_Pedal_Intervention | This signal shows whether the brake pedal is depressed by a driver (intervention) | T.B.D. |
| Steering_Wheel_Intervention | This signal shows whether the steering wheel is turned by a driver (intervention) | T.B.D. |
| Shift_Lever_Intervention | This signal shows whether the shift lever is controlled by a driver (intervention) | T.B.D. |
| WheelSpeed_FL | wheel speed value (Front Left Wheel) | N/A |
| WheelSpeed_FL_Rotation | Rotation direction of wheel (Front Left) | N/A |
| WheelSpeed_FR | wheel speed value (Front Right Wheel) | N/A |
| WheelSpeed_FR_Rotation | Rotation direction of wheel (Front Right) | N/A |
| WheelSpeed_RL | wheel speed value (Rear Left Wheel) | Applied |
| WheelSpeed_RL_Rotation | Rotation direction of wheel (Rear Left) | Applied |
| WheelSpeed_RR | wheel speed value (Rear Right Wheel) | Applied |
| WheelSpeed_RR_Rotation | Rotation direction of wheel (Rear Right) | Applied |
| Actual_Moving_Direction | Moving direction of vehicle | Applied |
| Longitudinal_Velocity | Estimated longitudinal velocity of vehicle | Applied |
| Longitudinal_Acceleration | Estimated longitudinal acceleration of vehicle | Applied |
| Lateral_Acceleration | Sensor value of lateral acceleration of vehicle | Applied |
| Yawrate | Sensor value of Yaw rate | Applied |
| Autonomy_State | State of whether autonomy mode or manual mode | Applied |
| Autonomy_Ready | Situation of whether the vehicle can transition to autonomy mode or not | Applied |
| Autonomy_Fault | Status of whether the fault regarding a functionality in autonomy mode occurs or not | Applied |

3.3.3.1. Propulsion Direction Status

Current shift range
Values

TABLE 10

| value | Description | remarks |
|---|---|---|
| 0 | Reserved | |
| 1 | P | |
| 2 | R | |
| 3 | N | |
| 4 | D | |
| 5 | B | |
| 6 | Reserved | |
| 7 | Invalid value | |

Remarks

When the shift range is indeterminate, this output is set to "Invalid Value".

When the vehicle becomes the following status during VO mode, [Propulsion Direction Status] will turn to "P".

[Longitudinal_Velocity]=0 [km/h]

[Brake_Pedal_Position]<Threshold value (T.B.D.) (in case of being determined that the pedal isn't depressed)

[1st_Left_Seat_Belt_Status]=Unbuckled

[1st_Left_Door_Open_Status]=Opened

3.3.3.2. Propulsion Direction by Driver

Shift lever position by driver operation
Value

TABLE 11

| value | Description | remarks |
|---|---|---|
| 0 | No Request | |
| 1 | P | |
| 2 | R | |
| 3 | N | |
| 4 | D | |
| 5 | B | |
| 6 | Reserved | |
| 7 | Invalid value | |

Remarks

Output based on the lever position operated by driver

If the driver releases his hand of the shift lever, the lever returns to the central position and the output is set as "No Request".

When the vehicle becomes the following status during NVO mode, [Propulsion Direction by Driver] will turn to "1(P)".

[Longitudinal_Velocity]=0 [km/h]

[Brake_Pedal_Position]<Threshold value (T.B.D.) (in case of being determined that the pedal isn't depressed)

[1st_Left_Seat_Belt_Status]=Unbuckled

[1st_Left_Door_Open_Status]=Opened

3.3.3.3. Immobilization Status

Output EPB and Shift-P status
Values
<Primary>

TABLE 12

| Value | | | |
|---|---|---|---|
| Shift | EPB | Description | Remarks |
| 0 | 0 | Shift set to other than P, and EPB Released | |
| 1 | 0 | Shift set to P and EPB Released | |
| 0 | 1 | Shift set to other than P, and EPB applied | |
| 1 | 1 | Shift set to P and EPB Applied | |

<Secondary>

TABLE 13

| Value | | | |
|---|---|---|---|
| Shift | | Description | Remarks |
| 0 | 0 | Other than Shift P | |
| 1 | 0 | Shift P | |
| 0 | 1 | Reserved | |
| 1 | 1 | Reserved | |

Remarks
Secondary signal does not include EPB lock status.

3.3.3.4. Immobilization Request by Driver

Driver operation of EPB switch
Values

TABLE 14

| value | Description | remarks |
|---|---|---|
| 0 | No Request | |
| 1 | Engaged | |
| 2 | Released | |
| 3 | Invalid value | |

Remarks

"Engaged" is outputted while the EPB switch is being pressed.

"Released" is outputted while the EPB switch is being pulled.

3.3.3.5. Standstill Status

Vehicle stationary status
Values

TABLE 15

| Value | Description | remarks |
|---|---|---|
| 0 | Released | |
| 1 | Applied | |
| 2 | Reserved | |
| 3 | Invalid value | |

Remarks

When Standstill Status=Applied continues for 3 minutes, EPB is activated.

If the vehicle is desired to start, ADS requests Standstill Command="Released".

3.3.3.6. Estimated_Coasting_Rate

Estimated vehicle deceleration when throttle is closed
Values
[unit: m/s²]
Remarks
Estimated acceleration at WOT is calculated.
Slope and road load etc. are taken into estimation.
When the Propulsion Direction Status is "D", the acceleration to the forward direction shows a positive value.
When the Propulsion Direction Status is "R", the acceleration to the reverse direction shows a positive value.

3.3.3.7. Estimated_Max_Accel_Capability

Estimated maximum acceleration
Values
[unit: m/s²]
Remarks
The acceleration at WOT is calculated.
Slope and road load etc. are taken into estimation.
The direction decided by the shift position is considered to be plus.

3.3.3.8. Estimated_Max_Decel_Capability

Estimated maximum deceleration
Values
−9.8 to 0 [unit: m/s²]
Remarks
Affected by Brake_System_Degradation_Modes. Details are T.B.D.
Based on vehicle state or road condition, cannot output in some cases

3.3.3.9. Estimated_Road_Wheel_Angle_Actual

Front wheel steer angle
Values

TABLE 16

| value | Description | Remarks |
| --- | --- | --- |
| others | [unit: rad] | |
| Minimum Value | Invalid value | The sensor is invalid. |

Remarks
Left is positive value (+). Right is negative value (−).
Before "the wheel angle when the vehicle is going straight" becomes available, this signal is Invalid value.

3.3.3.10. Estimated_Road_Wheel_Angle_Rate_Actual

Front wheel steer angle rate
Values

TABLE 17

| value | Description | Remarks |
| --- | --- | --- |
| others | [unit: rad/s] | |
| Minimum Value | Invalid value | |

Remarks
Left is positive value (+). Right is negative value (−).

3.3.3.11. Steering_Wheel_Angle_Actual

Steering wheel angle
Values

TABLE 18

| Value | Description | Remarks |
| --- | --- | --- |
| others | [unit: rad] | |
| Minimum Value | Invalid value | |

Remarks
Left is positive value (+). Right is negative value (−).
The steering angle converted from the steering assist motor angle
Before "the wheel angle when the vehicle is going straight" becomes available, this signal is Invalid value.

3.3.3.12. Steering_Wheel_Angle_Rate_Actual

Steering wheel angle rate
Values

TABLE 19

| Value | Description | Remarks |
| --- | --- | --- |
| others | [unit: rad/s] | |
| Minimum Value | Invalid value | |

Remarks
Left is positive value (+). Right is negative value (−).
The steering angle rate converted from the steering assist motor angle rate

3.3.3.13. Current_Road_Wheel_Angle_Rate_Limit

Figure 11:
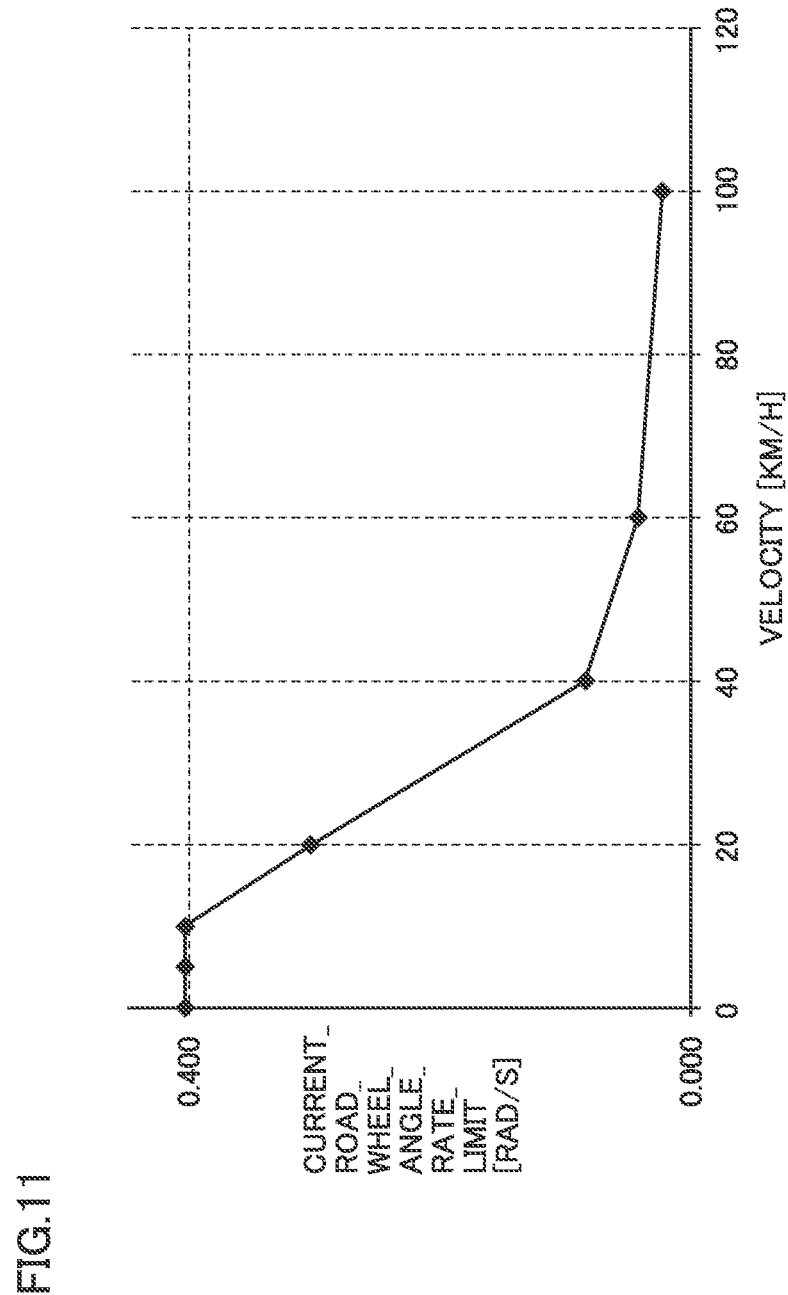
FIG. 11 is a diagram showing a limit value of variation in tire turning angle.

Road wheel angle rate limit
Values
When stopped: 0.4 [rad/s]
While running: Show "Remarks"
Remarks
Calculated from the "vehicle speed-steering angle rate" chart like below
A) At a very low speed or stopped situation, use fixed value of 0.4 [rad/s]
B) At a higher speed, the steering angle rate is calculated from the vehicle speed using 2.94 m/s³
The threshold speed between A and B is 10 [km/h] (FIG. 11).

3.3.3.14. Estimated_Max_Lateral_Acceleration_Capability

Estimated max lateral acceleration
Values
2.94 [unit: m/s²] fixed value
Remarks
Wheel Angle controller is designed within the acceleration range up to 2.94 m/s².

3.3.3.15. Estimated_Max_Lateral_Acceleration_Rate_Capability

Estimated max lateral acceleration rate
Values
2.94 [unit: m/s³] fixed value

Remarks
Wheel Angle controller is designed within the acceleration range up to 2.94 m/s³.

3.3.3.16. Accelerator_Pedal_Position

Position of the accelerator pedal (How much is the pedal depressed?)
Values
0 to 100 [unit: %]
Remarks
In order not to change the acceleration openness suddenly, this signal is filtered by smoothing process.
In normal condition
   The accelerator position signal after zero point calibration is transmitted.
In failure condition
   Transmitted failsafe value (0xFF)

3.3.3.17. Accelerator_Pedal_Intervention

This signal shows whether the accelerator pedal is depressed by a driver (intervention).
Values

TABLE 20

| Value | Description | Remarks |
|---|---|---|
| 0 | Not depressed | |
| 1 | depressed | |
| 2 | Beyond autonomy acceleration | |

Figure 12:
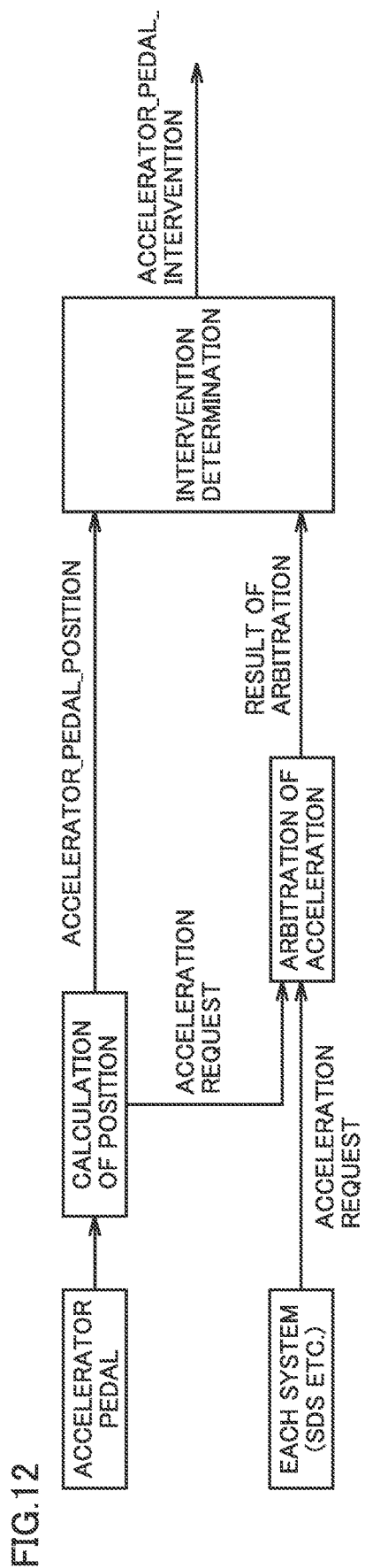
FIG. 12 is a diagram illustrating intervention by an accelerator pedal.

Remarks
When Accelerator_Pedal_Position is higher than the defined threshold value (ACCL_INTV), this signal [Accelerator_Pedal_Intervention] will turn to "depressed".
When the requested acceleration from depressed acceleration pedal is higher than the requested acceleration from system (ADS, PCS etc.), this signal will turn to "Beyond autonomy acceleration".
   During NVO mode, accelerator request will be rejected. Therefore, this signal will not turn to "2".
Detail design (FIG. 12)

3.3.3.18. Brake_Pedal_Position

Position of the brake pedal (How much is the pedal depressed?)
Values
0 to 100 [unit: %]
Remarks
In the brake pedal position sensor failure:
   Transmitted failsafe value (0xFF)
Due to assembling error, this value might be beyond 100%.

3.3.3.19. Brake_Pedal_Intervention

This signal shows whether the brake pedal is depressed by a driver (intervention).
Values

TABLE 21

| Value | Description | Remarks |
|---|---|---|
| 0 | Not depressed | |
| 1 | depressed | |
| 2 | Beyond autonomy deceleration | |

Figure 13:
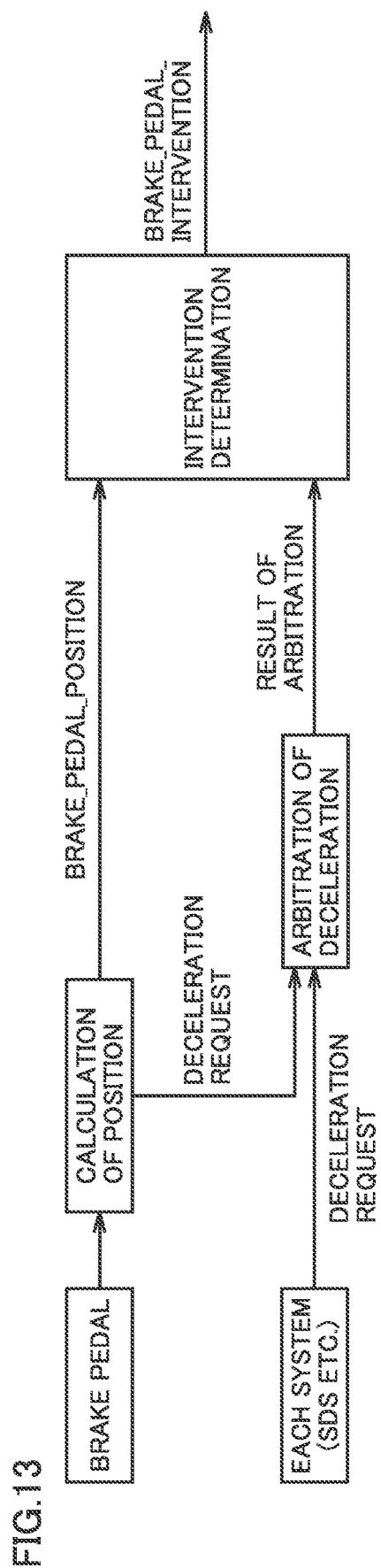
FIG. 13 is a diagram illustrating intervention by a brake pedal.

Remarks
When Brake_Pedal_Position is higher than the defined threshold value (BRK_INTV), this signal [Brake_Pedal_Intervention] will turn to "depressed".
When the requested deceleration from depressed brake pedal is higher than the requested deceleration from system (ADS, PCS etc.), this signal will turn to "Beyond autonomy deceleration".
Detail design (FIG. 13)

3.3.3.20. Steering_Wheel_Intervention

This signal shows whether the steering wheel is turned by a driver (intervention).
Values

TABLE 22

| Value | Description | Remarks |
|---|---|---|
| 0 | Not turned | |
| 1 | Turned collaboratively | Driver steering torque + steering motor torque |
| 2 | Turned by human driver | |

Remarks
In "Steering Wheel Intervention=1", considering the human driver's intent, EPS system will drive the steering with the Human driver collaboratively.
In "Steering Wheel Intervention=2", considering the human driver's intent, EPS system will reject the steering requirement from autonomous driving kit. (The steering will be driven the human driver.)

3.3.3.21. Shift_Lever_Intervention

This signal shows whether the shift lever is controlled by a driver (intervention).
Values

TABLE 23

| Value | Description | Remarks |
|---|---|---|
| 0 | OFF | |
| 1 | ON | Controlled (moved to any shift position) |

Remarks
N/A

3.3.3.22. WheelSpeed_FL, WheelSpeed_FR, WheelSpeed_RL, WheelSpeed_RR wheel speed value
Values

TABLE 24

| Value | Description | Remarks |
|---|---|---|
| others | Velocity [unit: m/s] | |
| Maximum Value | Invalid value | The sensor is invalid. |

Remarks
T.B.D.

3.3.3.23. WheelSpeed_FL_Rotation, WheelSpeed_FR_Rotation, WheelSpeed_RL_Rotation, Wheel_Speed_RR_Rotation Rotation direction of each wheel
Values

TABLE 25

| value | Description | remarks |
|---|---|---|
| 0 | Forward | |
| 1 | Reverse | |
| 2 | Reserved | |
| 3 | Invalid value | The sensor is invalid. |

Remarks
After activation of ECU, until the rotation direction is fixed, "Forward" is set to this signal.
When detected continuously 2 (two) pulses with the same direction, the rotation direction will be fixed.

3.3.3.24. Actual_Moving_Direction

Rotation direction of wheel
Values

TABLE 26

| value | Description | remarks |
|---|---|---|
| 0 | Forward | |
| 1 | Reverse | |
| 2 | Standstill | |
| 3 | Undefined | |

Remarks
This signal shows "Standstill" when four wheel speed values are "0" during a constant time.
When other than above, this signal will be determined by the majority rule of four WheelSpeed_Rotations.
When more than two WheelSpeed_Rotations are "Reverse", this signal shows "Reverse".
When more than two WheelSpeed_Rotations are "Forward", this signal shows "Forward".
When "Forward" and "Reverse" are the same counts, this signal shows "Undefined".

3.3.3.25. Longitudinal_Velocity

Estimated longitudinal velocity of vehicle
Values

TABLE 27

| Value | Description | Remarks |
|---|---|---|
| others | Velocity [unit: m/s] | |
| Maximum Value | Invalid value | The sensor is invalid. |

Remarks
This signal is output as the absolute value.

3.3.3.26. Longitudinal_Acceleration

Estimated longitudinal acceleration of vehicle
Values

TABLE 28

| value | Description | Remarks |
|---|---|---|
| others | Acceleration [unit: m/s$^2$] | |
| Minimum Value | Invalid value | The sensor is invalid. |

Remarks
This signal will be calculated with wheel speed sensor and acceleration sensor.
When the vehicle is driven at a constant velocity on the flat road, this signal shows "0".

3.3.3.27. Lateral Acceleration

Sensor value of lateral acceleration of vehicle
Values

TABLE 29

| Value | Description | Remarks |
|---|---|---|
| others | Acceleration [unit: m/s$^2$] | |
| Minimum Value | Invalid value | The sensor is invalid. |

Remarks
The positive value means counterclockwise. The negative value means clockwise.

3.3.3.28. Yawrate

Sensor value of Yaw rate
Value

TABLE 30

| Value | Description | Remarks |
|---|---|---|
| others | Yaw rate [unit: deg/s] | |
| Minimum Value | Invalid value | The sensor is invalid. |

Remarks
The positive value means counterclockwise. The negative value means clockwise.

3.3.3.29. Autonomy_State

State of whether autonomy mode or manual mode
Values

TABLE 31

| value | Description | Remarks |
|---|---|---|
| 00 | Manual Mode | The mode starts from Manual mode. |
| 01 | Autonomous Mode | |

Remarks
The initial state is the Manual mode. (When Ready ON, the vehicle will start from the Manual mode.)

3.3.3.30. Autonomy_Ready

Situation of whether the vehicle can transition to autonomy mode or not
Values

TABLE 32

| value | Description | Remarks |
| --- | --- | --- |
| 00b | Not Ready For Autonomy | |
| 01b | Ready For Autonomy | |
| 11b | Invalid | means the status is not determined. |

Remarks
This signal is a part of transition conditions toward the Autonomy mode.
Please see the summary of conditions.

3.3.3.31. Autonomy_Fault

Status of whether the fault regarding a functionality in autonomy mode occurs or not
Values

TABLE 33

| value | Description | Remarks |
| --- | --- | --- |
| 00b | No fault | |
| 01b | Fault | |
| 11b | Invalid | means the status is not determined. |

Remarks
[T.B.D.] Please see the other material regarding the fault codes of a functionality in autonomy mode.
[T.B.D.] Need to consider the condition to release the status of "fault".

3.4. APIs for BODY Control

3.4.1. Functions

T.B.D.

3.4.2. Inputs

TABLE 34

| Signal Name | Description | Redundancy |
| --- | --- | --- |
| Turnsignallight_Mode_Command | Command to control the turnsignallight mode of the vehicle platform | N/A |
| Headlight_Mode_Command | Command to control the headlight mode of the vehicle platform | N/A |
| Hazardlight_Mode_Command | Command to control the hazardlight mode of the vehicle platform | N/A |
| Horn_Pattern_Command | Command to control the pattern of horn ON-time and OFF-time per cycle of the vehicle platform | N/A |
| Horn_Number_of_Cycle_Command | Command to control the Number of horn ON/OFF cycle of the vehicle platform | N/A |
| Horn_Continuous_Command | Command to control of horn ON of the vehicle platform | N/A |
| Windshieldwiper_Mode_Front_Command | Command to control the front windshield wiper of the vehicle platform | N/A |
| Windshieldwiper_Intermittent_Wiping_Speed_Command | Command to control the Windshield wiper actuation interval at the Intermittent mode | N/A |
| Windshieldwiper_Mode_Rear_Command | Command to control the rear windshield wiper mode of the vehicle platform | N/A |
| Hvac_1st_Command | Command to start/stop 1st row air conditioning control | N/A |
| Hvac_2nd_Command | Command to start/stop 2nd row air conditioning control | N/A |
| Hvac_TargetTemperature_1st_Left_Command | Command to set the target temperature around front left area | N/A |
| Hvac_TargetTemperature_1st_Right_Command | Command to set the target temperature around front right area | N/A |
| Hvac_TargetTemperature_2nd_Left_Command | Command to set the target temperature around rear left area | N/A |
| Hvac_TargetTemperature_2nd_Right_Command | Command to set the target temperature around rear right area | N/A |
| Hvac_Fan_Level_1st_Row_Command | Command to set the fan level on the front AC | N/A |
| Hvac_Fan_Level_2nd_Row_Command | Command to set the fan level on the rear AC | N/A |
| Hvac_1st_Row_AirOutlet_Mode_Command | Command to set the mode of 1st row air outlet | N/A |
| Hvac_2nd_Row_AirOutlet_Mode_Command | Command to set the mode of 2nd row air outlet | N/A |
| Hvac_Recirculate_Command | Command to set the air recirculation mode | N/A |
| Hvac_AC_Command | Command to set the AC mode | N/A |

3.4.2.1. Turnsignallight_Mode_Command

Command to control the turnsignallight mode of the vehicle platform
Values

TABLE 35

| value | Description | remarks |
|---|---|---|
| 0 | OFF | Blinker OFF |
| 1 | Right | Right blinker ON |
| 2 | Left | Left blinker ON |
| 3 | reserved | |

Remarks
T.B.D.
Detailed Design
When Turnsignallight_Mode_Command=1, vehicle platform sends left blinker on request.
When Turnsignallight_Mode_Command=2, vehicle platform sends right blinker on request.

3.4.2.2. Headlight_Mode_Command

Command to control the headlight mode of the vehicle platform
Values

TABLE 36

| Value | Description | remarks |
|---|---|---|
| 0 | No Request | Keep current mode |
| 1 | TAIL mode request | side lamp mode |
| 2 | HEAD mode request | Lo mode |
| 3 | AUTO mode request | |
| 4 | HI mode request | |
| 5 | OFF Mode Request | |
| 6-7 | reserved | |

Remarks
This command is valid when Headlight_Driver_Input=OFF or Auto mode ON.
Driver input overrides this command.
Headlight mode changes when Vehicle platform receives once this command.

3.4.2.3. Hazardlight_Mode_Command

Command to control the hazardlight mode of the vehicle platform
Values

TABLE 37

| value | Description | remarks |
|---|---|---|
| 0 | OFF | command for hazardlight OFF |
| 1 | ON | command for hazardlight ON |

Remarks
Driver input overrides this command.
Hazardlight is active during Vehicle Platform receives ON command.

3.4.2.4. Horn Pattern Command

Command to control the pattern of horn ON-time and OFF-time per cycle of the vehicle platform
Values

TABLE 38

| value | Description | remarks |
|---|---|---|
| 0 | No request | |
| 1 | Pattern 1 | ON-time: 250 ms OFF-time: 750 ms |
| 2 | Pattern 2 | ON-time: 500 ms OFF-time: 500 ms |
| 3 | Pattern 3 | reserved |
| 4 | Pattern 4 | reserved |
| 5 | Pattern 5 | reserved |
| 6 | Pattern 6 | reserved |
| 7 | Pattern 7 | Reserved |

Remarks
Pattern 1 is assumed to use single short ON, Pattern 2 is assumed to use ON-OFF repeating.
Detail is under internal discussion.

3.4.2.5. Horn_Number_of_Cycle_Command

Command to control the Number of horn ON/OFF cycle of the vehicle platform Values
0~7 [-]
Remarks
Detail is under internal discussion.

3.4.2.6. Horn_Continuous_Command

Command to control of horn ON of the vehicle platform
Values

TABLE 39

| value | Description | remarks |
|---|---|---|
| 0 | No request | |
| 1 | ON request | |

Remarks
This command overrides Horn Pattern Command, Horn_Number_of_Cycle_Command.
Horn is active during Vehicle Platform receives ON command.
Detail is under internal discussion.

3.4.2.7. Windshieldwiper_Mode_Front_Command

Command to control the front windshield wiper of the vehicle platform
Values

TABLE 40

| value | Description | remarks |
|---|---|---|
| 0 | OFF mode request | |
| 1 | Lo mode request | |
| 2 | Hi mode request | |
| 3 | Intermittent mode request | |
| 4 | Auto mode request | |
| 5 | Mist mode request | One-Time Wiping |
| 6, 7 | Reserved | |

Remarks
This command is under internal discussion the timing of valid.
This command is valid when Windshieldwiper_Front_Driver_Input=OFF or Auto mode ON.

Driver input overrides this command.
Windshieldwiper mode is kept during Vehicle platform is receiving the command.

3.4.2.8. Windshieldwiper_Intermittent_Wiping_Speed_Command

Command to control the Windshield wiper actuation interval at the Intermittent mode
Values

TABLE 41

| value | Description | remarks |
|---|---|---|
| 0 | FAST | |
| 1 | SECOND FAST | |
| 2 | THIRD FAST | |
| 3 | SLOW | |

Remarks
This command is valid when Windshieldwiper_Mode_Front_Status=INT.
Driver input overrides this command.
Windshieldwiper intermittent mode changes when Vehicle platform receives once this command.

3.4.2.9. Windshieldwiper Mode Rear Command

Command to control the rear windshield wiper mode of the vehicle platform
Values

TABLE 42

| value | Description | Remarks |
|---|---|---|
| 0 | OFF mode request | |
| 1 | Lo mode request | |
| 2 | reserved | |
| 3 | Intermittent mode request | |
| 4-7 | reserved | |

Remarks
Driver input overrides this command.
Windshieldwiper mode is kept during Vehicle platform is receiving the command.
Wiping speed of intermittent mode is not variable.

3.4.2.10. Hvac_1st_Command

Command to start/stop 1st row air conditioning control
Values

TABLE 43

| value | Description | Remarks |
|---|---|---|
| 00 | No request | |
| 01 | ON | means turning the 1st air conditioning control to ON |
| 02 | OFF | means turning the 1st air conditioning control to OFF |

Remarks
The hvac of S-AM has a synchronization functionality. Therefore, in order to control 4 (four) hvacs (1st_left/right, 2nd_left/right) individually, VCIB achieves the following procedure after Ready-ON. (This functionality will be implemented from the CV.)

1: Hvac_1st_Command=ON
2: Hvac_2nd_Command=ON
3: Hvac_TargetTemperature_2nd_Left_Command
4: Hvac_TargetTemperature_2nd_Right_Command
5: Hvac_Fan_Level_2nd_Row_Command
6: Hvac_2nd_Row_AirOutlet_Mode_Command
7: Hvac_TargetTemperature_1st_Left_Command
8: Hvac_TargetTemperature_1st_Right_Command
9: Hvac_Fan_Level_1st_Row_Command
10: Hvac_1st_Row_AirOutlet_Mode_Command
* The interval between each command needs 200 ms or more.
* Other commands are able to be executed after #1.

3.4.2.11. Hvac_2nd_Command

Command to start/stop 2nd row air conditioning control
Values

TABLE 44

| value | Description | Remarks |
|---|---|---|
| 00 | No request | |
| 01 | ON | means turning the 2nd air conditioning control to ON |
| 02 | OFF | means turning the 2nd air conditioning control to OFF |

Remarks
N/A

3.4.2.12. Hvac_TargetTemperature_1st_Left_Command

Command to set the target temperature around front left area
Values

TABLE 45

| value | Description | Remarks |
|---|---|---|
| 0 | No request | |
| 60 to 85 [unit: ° F.] (by 1.0° F.) | Temperature direction | |

Remarks
N/A

3.4.2.13. Hvac_TargetTemperature_1st_Right_Command

Command to set the target temperature around front right area
Values

TABLE 46

| value | Description | Remarks |
|---|---|---|
| 0 | No request | |
| 60 to 85 [unit: ° F.] (by 1.0° F.) | Temperature direction | |

Remarks
N/A

3.4.2.14. Hvac_TargetTemperature_2nd_Left_Command

Command to set the target temperature around rear left area

Values

TABLE 47

| value | Description | Remarks |
|---|---|---|
| 0 | No request | |
| 60 to 85 [unit: ° F.] (by 1.0° F.) | Temperature direction | |

Remarks

N/A

3.4.2.15. Hvac_TargetTemperature_2nd_Right_Command

Command to set the target temperature around rear right area

Values

TABLE 48

| value | Description | Remarks |
|---|---|---|
| 0 | No request | |
| 60 to 85 [unit: ° F.] (by 1.0° F.) | Temperature direction | |

Remarks

N/A

3.4.2.16. Hvac_Fan_Level_1st_Row_Command

Command to set the fan level on the front AC

Values

TABLE 49

| value | Description | Remarks |
|---|---|---|
| 0 | No request | |
| 1 to 7 (Maximum) | Fan level direction | |

Remarks

If you would like to turn the fan level to 0 (OFF), you should transmit "Hvac_1st_Command=OFF".

If you would like to turn the fan level to AUTO, you should transmit "Hvac_1st_Command=ON".

3.4.2.17. Hvac_Fan_Level_2nd_Row_Command

Command to set the fan level on the rear AC

Values

TABLE 50

| value | Description | Remarks |
|---|---|---|
| 0 | No request | |
| 1 to 7 (Maximum) | Fan level direction | |

Remarks

If you would like to turn the fan level to 0 (OFF), you should transmit "Hvac_2nd_Command=OFF".

If you would like to turn the fan level to AUTO, you should transmit "Hvac_2nd_Command=ON".

3.4.2.18. Hvac_1st_Row_AirOutlet_Mode_Command

Command to set the mode of 1st row air outlet

Values

TABLE 51

| value | Description | Remarks |
|---|---|---|
| 000b | No Operation | |
| 001b | UPPER | Air flows to the upper body |
| 010b | U/F | Air flows to the upper body and feet |
| 011b | FEET | Air flows to the feet. |
| 100b | F/D | Air flows to the feet and the windshield defogger operates |

Remarks

N/A

3.4.2.19. Hvac_2nd_Row_AirOutlet_Mode_CommandCommand to Set the Mode of 2nd Row Air Outlet Values

TABLE 52

| value | Description | Remarks |
|---|---|---|
| 000b | No Operation | |
| 001b | UPPER | Air flows to the upper body |
| 010b | U/F | Air flows to the upper body and feet |
| 011b | FEET | Air flows to the feet. |

Remarks

N/A

3.4.2.20. Hvac Recirculate Command

Command to set the air recirculation mode

Values

TABLE 53

| value | Description | Remarks |
|---|---|---|
| 00 | No request | |
| 01 | ON | means turning the air recirculation mode ON |
| 02 | OFF | means turning the air recirculation mode OFF |

Remarks

N/A

3.4.2.21. Hvac AC Command

Command to set the AC mode

Values

TABLE 54

| value | Description | remarks |
|---|---|---|
| 00 | No request | |
| 01 | ON | means turning the AC mode ON |
| 02 | OFF | means turning the AC mode OFF |

Remarks
N/A

3.4.3. Outputs

TABLE 55

| Signal Name | Description | Redundancy |
| --- | --- | --- |
| Turnsignallight_Mode_Status | Status of the current turnsignallight mode of the vehicle platform | N/A |
| Headlight_Mode_Status | Status of the current headlight mode of the vehicle platform | N/A |
| Hazardlight_Mode_Status | Status of the current hazardlight mode of the vehicle platform | N/A |
| Horn_Status | Status of the current horn of the vehicle platform | N/A |
| Windshieldwiper_Mode_Front_Status | Status of the current front windshield wiper mode of the vehicle platform | N/A |
| Windshieldwiper_Mode_Rear_Status | Status of the current rear windshield wiper mode of the vehicle platform | N/A |
| Hvac_$1^{st}$_Status | Status of activation of the $1^{st}$ row HVAC | N/A |
| Hvac_$2^{nd}$_Status | Status of activation of the $2^{nd}$ row HVAC | N/A |
| Hvac_Temperature_$1^{st}$_Left_Status | Status of set temperature of $1^{st}$ row left | N/A |
| Hvac_Temperature_$1^{st}$_Right_Status | Status of set temperature of $1^{st}$ row right | N/A |
| Hvac_Temperature_$2^{nd}$_Left_Status | Status of set temperature of $2^{nd}$ row left | N/A |
| Hvac_Temperature_$2^{nd}$_Right_Status | Status of set temperature of $2^{nd}$ row right | N/A |
| Hvac_Fan_Level_$1^{st}$_Row_Status | Status of set fan level of $1^{st}$ row | N/A |
| Hvac_Fan_Level_$2^{nd}$_Row_Status | Status of set fan level of $2^{nd}$ row | N/A |
| Hvac_1st_Row_AirOutlet_Mode_Status | Status of mode of 1st row air outlet | N/A |
| Hvac_2nd_Row_AirOutlet_Mode_Status | Status of mode of 2nd row air outlet | N/A |
| Hvac_Recirculate_Status | Status of set air recirculation mode | N/A |
| Hvac_AC_Status | Status of set AC mode | N/A |
| 1st_Right_Seat_Occupancy_Status | Seat occupancy status in 1st left seat | — |
| 1st_Left_Seat_Belt_Status | Status of driver's seat belt buckle switch | — |
| 1st_Right_Seat_Belt_Status | Status of passenger's seat belt buckle switch | — |
| 2nd_Left_Seat_Belt_Status | Seat belt buckle switch status in 2nd left seat | — |
| 2nd_Right_Seat_Belt_Status | Seat belt buckle switch status in 2nd right seat | — |

3.4.3.1. Turnsignallight_Mode_Status

Status of the current turnsignallight mode of the vehicle platform

Values

TABLE 56

| value | Description | Remarks |
| --- | --- | --- |
| 0 | OFF | Turn lamp = OFF |
| 1 | Left | Turn lamp L = ON (flashing) |
| 2 | Right | Turn lamp R = ON (flashing) |
| 3 | invalid | |

Remarks
At the time of the disconnection detection of the turn lamp, state is ON.
At the time of the short detection of the turn lamp, State is OFF.

3.4.3.2. Headlight_Mode_Status

Status of the current headlight mode of the vehicle platform

Values

TABLE 57

| Value | Description | Remarks |
| --- | --- | --- |
| 0 | OFF | |
| 1 | TAIL | |
| 2 | Lo | |
| 3 | reserved | |
| 4 | Hi | |
| 5-6 | reserved | |
| 7 | invalid | |

Remarks
N/A
Detailed Design
At the time of tail signal ON, Vehicle Platform sends 1.
At the time of Lo signal ON, Vehicle Platform sends 2.
At the time of Hi signal ON, Vehicle Platform sends 4.
At the time of any signal above OFF, Vehicle Platform sends 0.

3.4.3.3. Hazardlight_Mode_Status

Status of the current hazard lamp mode of the vehicle platform

Values

TABLE 58

| Value | Description | Remarks |
|---|---|---|
| 0 | OFF | Hazard lamp = OFF |
| 1 | Hazard | Hazard lamp = ON (flashing) |
| 2 | reserved | |
| 3 | invalid | |

Remarks
N/A

3.4.3.4. Horn_Status

Status of the current horn of the vehicle platform
Values

TABLE 59

| Value | Description | Remarks |
|---|---|---|
| 0 | OFF | |
| 1 | ON | |
| 2 | reserved (unsupport) | |
| 3 | invalid (unsupport) | |

Remarks
cannot detect any failure.
Vehicle platform sends "1" during Horn Pattern Command is active, if the horn is OFF.

3.4.3.5. Windshieldwiper_Mode_Front_Status

Status of the current front windshield wiper mode of the vehicle platform
Values

TABLE 60

| Value | Description | Remarks |
|---|---|---|
| 0 | OFF | Front wiper stopped |
| 1 | Lo | Front wiper being active in LO mode (also including being active in MIST, being active in coordination with washer, and being wiping at speed other than HI) |
| 2 | Hi | Front wiper being active in HI mode |
| 3 | INT | Front wiper being active in INT mode (also including motor stop while being active in INT mode and being active in INT mode owing to vehicle speed change function) |
| 4-5 | reserved | |
| 6 | fail | Front wiper failed |
| 7 | invalid | |

TABLE 61

| Value | Description | Remarks |
|---|---|---|
| 0 | OFF | Front wiper is stopped. |
| 1 | Lo | Front wiper is in LO mode (include in MIST mode, operation with washer, Medium speed). |
| 2 | Hi | Front wiper is in HI mode. |
| 3 | INT | Front wiper is in INT mode (include motor stopped between INT mode, INT operation of vehicle speed change function). |
| 4-5 | reserved | |
| 6 | fail | Front wiper is fail. |
| 7 | invalid | |

Remarks
Fail Mode Conditions
detect signal discontinuity
cannot detect except the above failure.

3.4.3.6. Windshieldwiper_Mode_Rear_Status

Status of the current rear windshield wiper mode of the vehicle platform
Values

TABLE 62

| Value | Description | Remarks |
|---|---|---|
| 0 | OFF | Rear wiper stopped |
| 1 | Lo | Rear wiper being in LO mode |
| 2 | reserved | |
| 3 | INT | Rear wiper being in INT mode |
| 4-5 | reserved | |
| 6 | fail | Rear wiper failed |
| 7 | invalid | |

Remarks
cannot detect any failure.

3.4.3.7. Hvac_1st_Status

Status of activation of the 1st row HVAC
Values

TABLE 63

| value | Description | remarks |
|---|---|---|
| 0b | OFF | |
| 1b | ON | |

Remarks
N/A

3.4.3.8. Hvac_2nd_Status

Status of activation of the 2nd row HVAC
Values

TABLE 64

| value | Description | remarks |
|---|---|---|
| 0b | OFF | |
| 1b | ON | |

Remarks
N/A

3.4.3.9. Hvac_Temperature_1st_Left_Status

Status of set temperature of 1st row left
Values

TABLE 65

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks
N/A

3.4.3.10. Hvac_Temperature_1st_Right_Status

Status of set temperature of 1st row right
Values

TABLE 66

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks
N/A

3.4.3.11. Hvac_Temperature_2nd_Left_Status

Status of set temperature of 2nd row left
Values

TABLE 67

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks
N/A

3.4.3.12. Hvac_Temperature_2nd_Right_Status

Status of set temperature of 2nd row right
Values

TABLE 68

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks
N/A

3.4.3.13. Hvac_Fan_Level_1st_Row_Status

Status of set fan level of 1st row
Values

TABLE 69

| value | Description | remarks |
|---|---|---|
| 0 | OFF | |
| 1-7 | Fan Level | |
| 8 | Undefined | |

Remarks
N/A

3.4.3.14. Hvac_Fan_Level_2nd_Row_Status

Status of set fan level of 2nd row
Values

TABLE 70

| value | Description | remarks |
|---|---|---|
| 0 | OFF | |
| 1-7 | Fan Level | |
| 8 | Undefined | |

Remarks
N/A

3.4.3.15. Hvac_1st_Row_AirOutlet_Mode_Status

Status of mode of 1st row air outlet
Values

TABLE 71

| value | Description | remarks |
|---|---|---|
| 000b | ALL OFF | when Auto mode is set |
| 001b | UPPER | Air flows to the upper body |
| 010b | U/F | Air flows to the upper body and feet |
| 011b | FEET | Air flows to the feet. |
| 100b | F/D | Air flows to the feet and the windshield defogger operates |
| 101b | DEF | The windshield defogger operates |
| 111b | Undefined | |

Remarks
N/A

3.4.3.16. Hvac_2nd_Row_AirOutlet_Mode_Status

Status of mode of 2nd row air outlet
Values

TABLE 72

| value | Description | remarks |
|---|---|---|
| 000b | ALL OFF | when Auto mode is set |
| 001b | UPPER | Air flows to the upper body |
| 010b | U/F | Air flows to the upper body and feet |
| 011b | FEET | Air flows to the feet. |
| 111b | Undefined | |

Remarks
N/A

3.4.3.17. Hvac Recirculate Status

Status of set air recirculation mode
Values

TABLE 73

| value | Description | remarks |
|---|---|---|
| 00 | OFF | means that the air recirculation mode is OFF |
| 01 | ON | means that the air recirculation mode is ON |

3.4.3.18. Hvac AC Status

Status of set AC mode
Values

TABLE 74

| value | Description | remarks |
|---|---|---|
| 00 | OFF | means that the AC mode is OFF |
| 01 | ON | means that the AC mode is ON |

Remarks
N/A

3.4.3.19. 1st Right Seat Occupancy Status

Seat occupancy status in 1st left seat
Values

TABLE 75

| value | Description | remarks |
|---|---|---|
| 0 | Not occupied | |
| 1 | Occupied | |
| 2 | Undecided | IG OFF or signal from sensor being lost |
| 3 | Failed | |

Remarks
When there is luggage on the seat, this signal may be set to "Occupied".

3.4.3.20. 1st_Left_Seat_Belt_Status

Status of driver's seat belt buckle switch
Values

TABLE 76

| value | Description | remarks |
|---|---|---|
| 0 | Buckled | |
| 1 | Unbuckled | |
| 2 | Undetermined | |
| 3 | Fault of a switch | |

Remarks
When Driver's seat belt buckle switch status signal is not set, [undetermined] is transmitted.
It is checking to a person in charge, when using it. (Outputs "undetermined=10" as an initial value.)
The judgement result of buckling/unbuckling shall be transferred to CAN transmission buffer within 1.3 s after IG_ON or before allowing firing, whichever is earlier.

3.4.3.21. 1st_Right_Seat_Belt_Status

Status of passenger's seat belt buckle switch
Values

TABLE 77

| value | Description | remarks |
|---|---|---|
| 0 | Buckled | |
| 1 | Unbuckled | |
| 2 | Undetermined | |
| 3 | Fault of a switch | |

Remarks
When Passenger's seat belt buckle switch status signal is not set, [undetermined] is transmitted.
It is checking to a person in charge, when using it. (Outputs "undetermined=10" as an initial value.)
The judgement result of buckling/unbuckling shall be transferred to CAN transmission buffer within 1.3 s after IG_ON or before allowing firing, whichever is earlier.

3.4.3.22. 2nd_Left_Seat_Belt_Status

Seat belt buckle switch status in 2nd left seat
Values

TABLE 78

| value | Description | remarks |
|---|---|---|
| 0 | Buckled | |
| 1 | Unbuckled | |
| 2 | Undetermined | |
| 3 | Reserved | |

Remarks
cannot detect sensor failure.

3.4.3.23. 2nd_Right_Seat_Belt_Status

Seat belt buckle switch status in 2nd right seat
Values

TABLE 79

| value | Description | remarks |
|---|---|---|
| 0 | Buckled | |
| 1 | Unbuckled | |
| 2 | Undetermined | |
| 3 | Reserved | |

Remarks
cannot detect any failure.

3.5. APIs for Power Control

3.5.1. Functions

T.B.D.

3.5.2. Inputs

TABLE 80

| Signal Name | Description | Redundancy |
|---|---|---|
| Power_Mode_Request | Command to control the power mode of the vehicle platform | N/A |

3.5.2.1. Power_Mode_Request

Command to control the power mode of the vehicle platform
Values

TABLE 81

| Value | Description | Remarks |
|---|---|---|
| 00 | No request | |
| 01 | Sleep | means "Ready OFF" |
| 02 | Wake | means that VCIB turns ON |
| 03 | Resd | Reserved for data expansion |
| 04 | Resd | Reserved for data expansion |
| 05 | Resd | Reserved for data expansion |
| 06 | Driving Mode | means "Ready ON" |

Remarks

Regarding "wake", let us share how to achieve this signal on the CAN. (See the other material) Basically, it is based on "ISO11989-2:2016". Also, this signal should not be a simple value. Anyway, please see the other material.

This API will reject the next request for a certain time [4000 ms] after receiving a request.

The followings are the explanation of the three power modes, i.e. [Sleep][Wake][Driving Mode], which are controllable via API.

[Sleep]
Vehicle power off condition. In this mode, the high voltage battery does not supply power, and neither VCIB nor other VP ECUs are activated.

[Wake]
VCIB is awake by the low voltage battery. In this mode, ECUs other than VCIB are not awake except for some of the body electrical ECUs.

[Driving Mode]
Ready ON mode. In this mode, the high voltage battery supplies power to the whole VP and all the VP ECUs including VCIB are awake.

3.5.3. Outputs

TABLE 82

| Signal Name | Description | Redundancy |
|---|---|---|
| Power_Mode_Status | Status of the current power mode of the vehicle platform | N/A |

3.5.3.1. Power_Mode_Status

Status of the current power mode of the vehicle platform
Values

TABLE 83

| Value | Description | Remarks |
|---|---|---|
| 00 | Resd | Reserved for same data align as mode request |
| 01 | Sleep | means "Ready OFF" |
| 02 | Wake | means that the only VCIB turns ON |
| 03 | Resd | Reserved for data expansion |
| 04 | Resd | Reserved for data expansion |
| 05 | Resd | Reserved for data expansion |

TABLE 83-continued

| Value | Description | Remarks |
|---|---|---|
| 06 | Driving Mode | means "Ready ON" |
| 07 | unknown | means unhealthy situation would occur |

Remarks

VCIB will transmit [Sleep] as Power_Mode_Status continuously for 3000 [ms] after executing the sleep sequence. And then, VCIB will be shutdown.

3.6. APIs for Safety

3.6.1. Functions

T.B.D.

3.6.2. Inputs

TABLE 84

| Signal Name | Description | Redundancy |
|---|---|---|
| T.B.D. | | |

3.6.3. Outputs

TABLE 85

| Signal Name | Description | Redundancy |
|---|---|---|
| Request for Operation | Request for operation according to status of vehicle platform toward ADS | |
| Passive_Safety_Functions_Triggered | Collision detection signal | — |
| Brake_System_Degradation_Modes | Indicates Brake_System_Degradation_Modes | Applied |
| Propulsive_System_Degradation_Modes | Indicates Propulsive_System_Degradation_Modes | N/A |
| Direction_Control_Degradation_Modes | Indicates Direction_Control_Degradation_Modes | N/A |
| WheelLock_Control_Degradation_Modes | Indicates WheelLock_Control_Degradation_Modes | Applied |
| Steering_System_Degradation_Modes | Indicates Steering_System_Degradation_Modes | Applied |
| Power_System_Degradation_Modes | Indicates Power_System_Degradation_Modes | Applied |
| Communication_Degradation_Modes | | |

3.6.3.1. Request for Operation

Request for operation according to status of vehicle platform toward ADS
Values

TABLE 86

| value | Description | remarks |
|---|---|---|
| 0 | No request | |
| 1 | Need maintenance | |
| 2 | Need back to garage | |
| 3 | Need stopping safely immediately | |
| Others | Reserved | |

Remarks
T.B.D.

3.6.3.2. Passive_Safety_Functions_Triggered

Crash detection Signal
Values

TABLE 87

| value | Description | remarks |
|---|---|---|
| 0 | Normal | |
| 5 | Crash Detection (airbag) | |
| 6 | Crash Detection (high voltage circuit is shut off) | |
| 7 | Invalid Value | |
| Others | Reserved | |

Remarks

When the event of crash detection is generated, the signal is transmitted 50 consecutive times every 100 [ms]. If the crash detection state changes before the signal transmission is completed, the high signal of priority is transmitted.

Priority: crash detection>normal

Transmits for 5 s regardless of ordinary response at crash, because the vehicle breakdown judgment system shall send a voltage OFF request for 5 s or less after crash in HV vehicle.

Transmission interval is 100 ms within fuel cutoff motion delay allowance time (1 s) so that data can be transmitted more than 5 times. In this case, an instantaneous power interruption is taken into account.

3.6.3.3. Brake_System_Degradation_Modes

Indicate Brake_System status
Values

TABLE 88

| value | Description | remarks |
|---|---|---|
| 0 | Normal | — |
| 1 | Failure detected | — |

Remarks
When the Failure is detected, Safe stop is moved.

3.6.3.4. Propulsive_System_Degradation_Modes

Indicate Powertrain System status
Values

TABLE 89

| value | Description | remarks |
|---|---|---|
| 0 | Normal | — |
| 1 | Failure detected | — |

Remarks
When the Failure is detected, Safe stop is moved.

3.6.3.5. Direction_Control_Degradation_Modes

Indicate Direction_Control status
Values

TABLE 90

| value | Description | remarks |
|---|---|---|
| 0 | Normal | — |
| 1 | Failure detected | — |

Remarks
When the Failure is detected, Safe stop is moved.
When the Failure is detected, Propulsion Direction Command is refused.

3.6.3.6. WheelLock_Control_Degradation_Modes

Indicate WheelLock_Control status
Values

TABLE 91

| value | Description | remarks |
|---|---|---|
| 0 | Normal | — |
| 1 | Failure detected | — |

Remarks
Primary indicates EPB status, and Secondary indicates SBW indicates.
When the Failure is detected, Safe stop is moved.

3.6.3.7. Steering_System_Degradation_Modes

Indicate Steering_System status
Values

TABLE 92

| value | Description | remarks |
|---|---|---|
| 0 | Normal | — |
| 1 | Failure detected | — |
| 2 | Stationary steering not possible | Temporary lowering in performance due to high temperature or the like |

Remarks
When the Failure are detected, Safe stop is moved.

3.6.3.8. Power_System_Degradation_Modes

[T.B.D]

3.6.3.9. Communication_Degradation_Modes

[T.B.D]

3.7. APIs for Security

3.7.1. Functions

T.B.D.

3.7.2. Inputs

TABLE 93

| Signal Name | Description | Redundancy |
|---|---|---|
| 1st_Left_Door_Lock_Command | Command to control each door lock of the vehicle platform | N/A |
| 1st_Right_Door_Lock_Command | Lock command supports only ALL Door Lock. Unlock command supports 1st-left Door unlock only, and ALL Door unlock. | N/A |
| 2nd_Left_Door_Lock_Command | | |
| 2nd_Right_Door_Lock_Command | Trunk Door Lock/unlock command include in ALL Door lock/unlock | N/A N/A |
| Central_Vehicle_Lock_Exterior_Command | Command to control the all door lock of the vehicle platform | N/A |

3.7.2.1. 1st_Left_Door_Lock_Command, 1st_Right_Door_Lock_Command, 2nd_Left_Door_Lock_Command, 2nd_Right_Door_Lock_Command Command to control each door lock of the vehicle platform
Values

TABLE 94

| Value | Description | Remarks |
|---|---|---|
| 0 | No Request | |
| 1 | Lock (unsupported) | |
| 2 | Unlock | |
| 3 | reserved | |

Remarks

Lock command supports only ALL Door Lock.

Unlock command supports 1st-left Door unlock only, and ALL Door unlock.

3.7.2.2. Central Vehicle Lock Exterior Command

Command to control the all door lock of the vehicle platform.
Values

TABLE 95

| Value | Description | Remarks |
|---|---|---|
| 0 | No Request | |
| 1 | Lock (all) | include trunk lock |
| 2 | Unlock (all) | include trunk unlock |
| 3 | reserved | |

Remarks

Lock command supports only ALL Door Lock.

Unlock command supports 1st-left Door unlock only, and ALL Door unlock.

3.7.3. Outputs

TABLE 96

| Signal Name | Description | Redundancy |
|---|---|---|
| 1st_Left_Door_Lock_Status | Status of the current 1st-left door lock mode of the vehicle platform | N/A |
| 1st_Right_Door_Lock_Status | Status of the current 1st-right door lock mode of the vehicle platform | N/A |
| 2nd_Left_Door_Lock_Status | Status of the current 2nd-left door lock mode of the vehicle platform | N/A |
| 2nd_Right_Door_Lock_Status | Status of the current 2nd-right door lock mode of the vehicle platform | N/A |
| Central_Vehicle_Exterior_Locked_Status | Status of the current all door lock mode of the vehicle platform | N/A |
| Vehicle_Alarm_Status | Status of the current vehicle alarm of the vehicle platform | N/A |

3.7.3.1. 1st_Left_Door_Lock_Status

Status of the current 1st-left door lock mode of the vehicle platform
Values

TABLE 97

| value | Description | Remarks |
|---|---|---|
| 0 | reserved | |
| 1 | Locked | D seat locked |
| 2 | Unlocked | D seat unlocked |
| 3 | invalid | |

Remarks
cannot detect any failure.

3.7.3.2. 1st_Right_Door_Lock_Status

Status of the current 1st-right door lock mode of the vehicle platform
Values

TABLE 98

| value | Description | remarks |
|---|---|---|
| 0 | reserved | |
| 1 | Locked | P seat locked |
| 2 | Unlocked | P seat unlocked |
| 3 | invalid | |

Remarks
cannot detect any failure.

3.7.3.3. 2nd_Left_Door_Lock_Status

Status of the current 2nd-left door lock mode of the vehicle platform
Values

TABLE 99

| Value | Description | remarks |
|---|---|---|
| 0 | Reserved | |
| 1 | Locked | RL seat locked |
| 2 | Unlocked | RL seat unlocked |
| 3 | invalid | |

Remarks
cannot detect any failure.

3.7.3.4. 2nd Right Door Lock Status

Status of the current 2nd-right door lock mode of the vehicle platform
Values

TABLE 100

| value | Description | remarks |
|---|---|---|
| 0 | reserved | |
| 1 | Locked | RR seat locked |
| 2 | Unlocked | RR seat unlocked |
| 3 | invalid | |

Remarks
cannot detect any failure.

3.7.3.5. Central_Vehicle_Exterior_Locked_Status

Status of the current all door lock mode of the vehicle platform
Values

TABLE 101

| value | Description | remarks |
|---|---|---|
| 0 | Reserved (unsupport) | |
| 1 | All Locked (unsupport) | |
| 2 | Anything Unlocked (unsupport) | |
| 3 | invalid (unsupport) | |

Remarks
Vehicle platform refers to each door lock status,
  in case any door unlocked, sends 0.
  in case all door locked, sends 1.

3.7.3.6. Vehicle Alarm Status

Status of the current vehicle alarm of the vehicle platform
Values

TABLE 102

| Value | Description | remarks |
|---|---|---|
| 0 | Disarmed | Auto alarm system not active |
| 1 | Armed | Auto alarm system active · not on alert |
| 2 | Active | Auto alarm system active · on alert |
| 3 | invalid | |

Remarks
N/A

3.8. APIs for MaaS Service

3.8.1. Functions

T.B.D.

3.8.2. Inputs

TABLE 103

| Signal Name | Description | Redundancy |
|---|---|---|
| T.B.D. | | |

3.8.3. Outputs

TABLE 104

| Signal Name | Description | Redundancy |
|---|---|---|
| T.B.D. | | |

Example 2

Toyota's MaaS Vehicle Platform
Architecture Specification
[Standard Edition #0.1]
History of Revision

TABLE 105

| Date of Revision | ver. | Summary of Revision | Reviser |
|---|---|---|---|
| 2019 Nov. 4 | 0.1 | Creating a new material | MaaS Business Div. |

Index
1. General Concept 4
1.1. Purpose of this Specification 4
1.2. Target Vehicle Type 4
1.3. Target Electronic Platform 4
1.4. Definition of Term 4
1.5. Precaution for Handling 4
1.6. Overall Structure of MaaS 4
1.7. Adopted Development Process 6
1.8. ODD (Operational Design Domain) 6
2. Safety Concept 7
2.1. Outline 7
2.2. Hazard analysis and risk assessment 7
2.3. Allocation of safety requirements 8
2.4. Redundancy 8
3. Security Concept 10
3.1. Outline 10
3.2. Assumed Risks 10
3.3. Countermeasure for the risks 10
   3.3.1. The countermeasure for a remote attack 11
   3.3.2. The countermeasure for a modification 11
3.4. Addressing Held Data Information 11
3.5. Addressing Vulnerability 11
3.6. Contract with Operation Entity 11
4. System Architecture 12
4.1. Outline 12
4.2. Physical LAN architecture (in-Vehicle) 12
4.3. Power Supply Structure 14
5. Function Allocation 15
5.1. in a healthy situation 15
5.2. in a single failure 16
6. Data Collection 18
6.1. At event 18
6.2. Constantly 18

1. General Concept

1.1. Purpose of this Specification

This document is an architecture specification of Toyota's MaaS Vehicle Platform and contains the outline of system in vehicle level.

1.2. Target Vehicle Type

This specification is applied to the Toyota vehicles with the electronic platform called 19ePF [ver.1 and ver.2].

The representative vehicle with 19ePF is shown as follows.

e-Palette, Sienna, RAV4, and so on.

1.3. Definition of Term

TABLE 106

| Term | Definition |
|---|---|
| ADS | Autonomous Driving System. |
| ADK | Autonomous Driving Kit |
| VP | Vehicle Platform. |
| VCIB | Vehicle Control Interface Box. This is an ECU for the interface and the signal converter between ADS and Toyota VP's sub systems. |

1.4. Precaution for Handling

This is an early draft of the document.

All the contents are subject to change. Such changes are notified to the users. Please note that some parts are still T.B.D. will be updated in the future.

2. Architectural Concept

2.1. Overall Structure of MaaS

Figure 14:
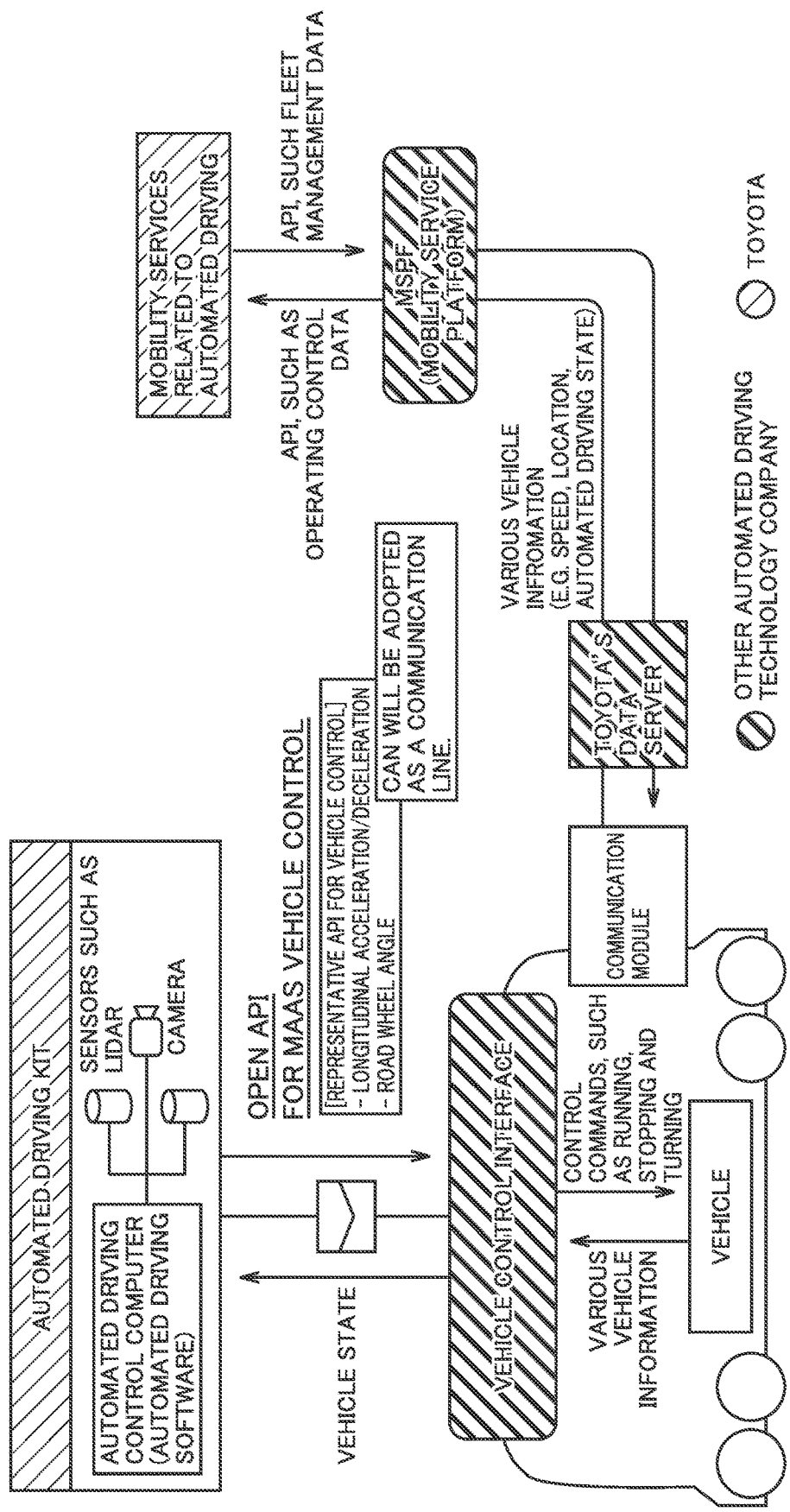
FIG. 14 is a diagram of an overall configuration of MaaS.

The overall structure of MaaS with the target vehicle is shown (FIG. 14).

Vehicle control technology is being used as an interface for technology providers.

Technology providers can receive open API such as vehicle state and vehicle control, necessary for development of automated driving systems.

2.2. Outline of System Architecture on the Vehicle

Figure 15:
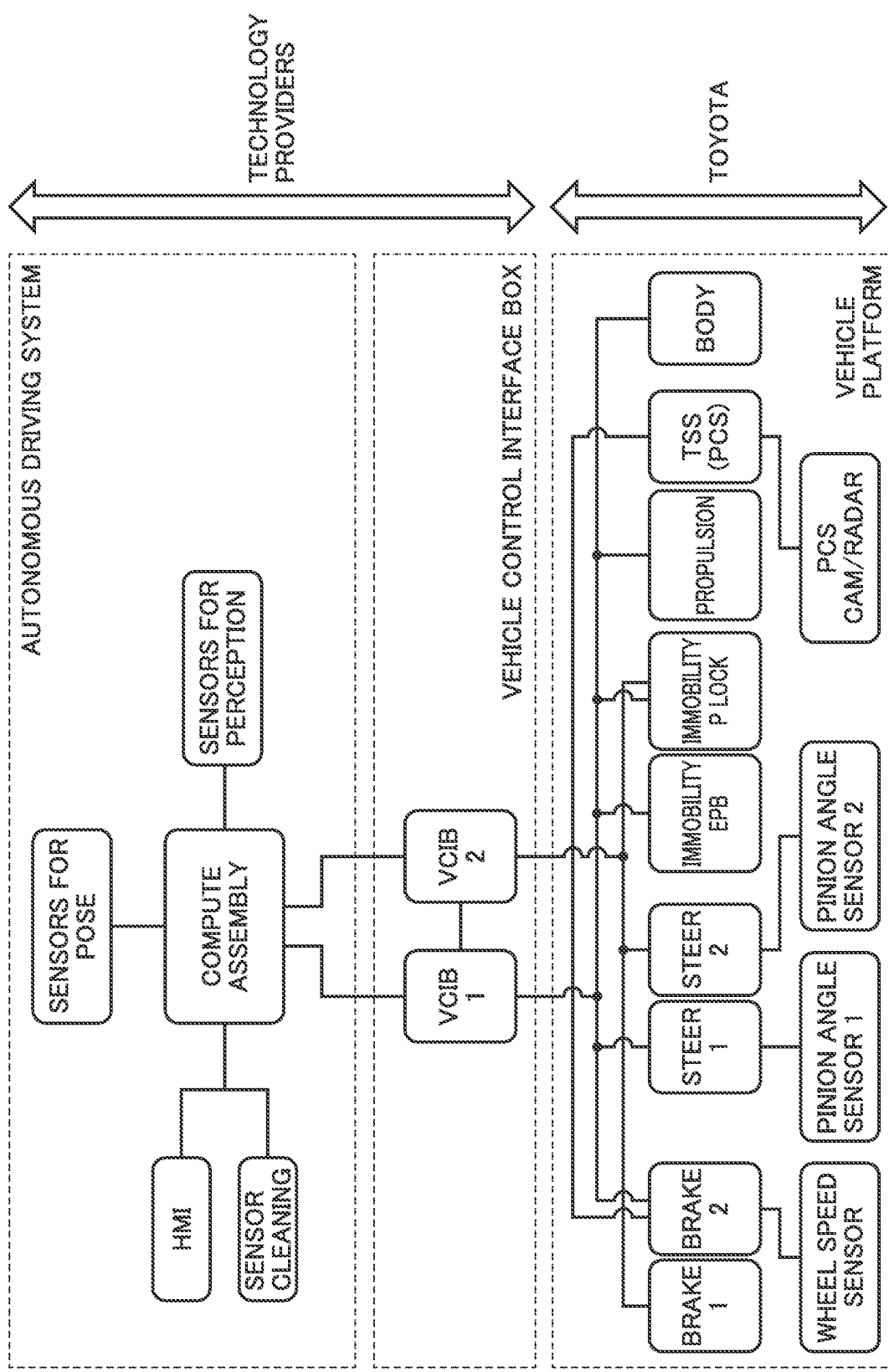
FIG. 15 is a diagram of a system configuration of a vehicle.

The system architecture on the vehicle as a premise is shown (FIG. 15).

The target vehicle of this document will adopt the physical architecture of using CAN for the bus between ADS and VCIB. In order to realize each API in this document, the CAN frames and the bit assignments are shown in the form of "bit assignment chart" as a separate document.

2.3. Outline of Power Supply Architecture on the Vehicle

Figure 16:
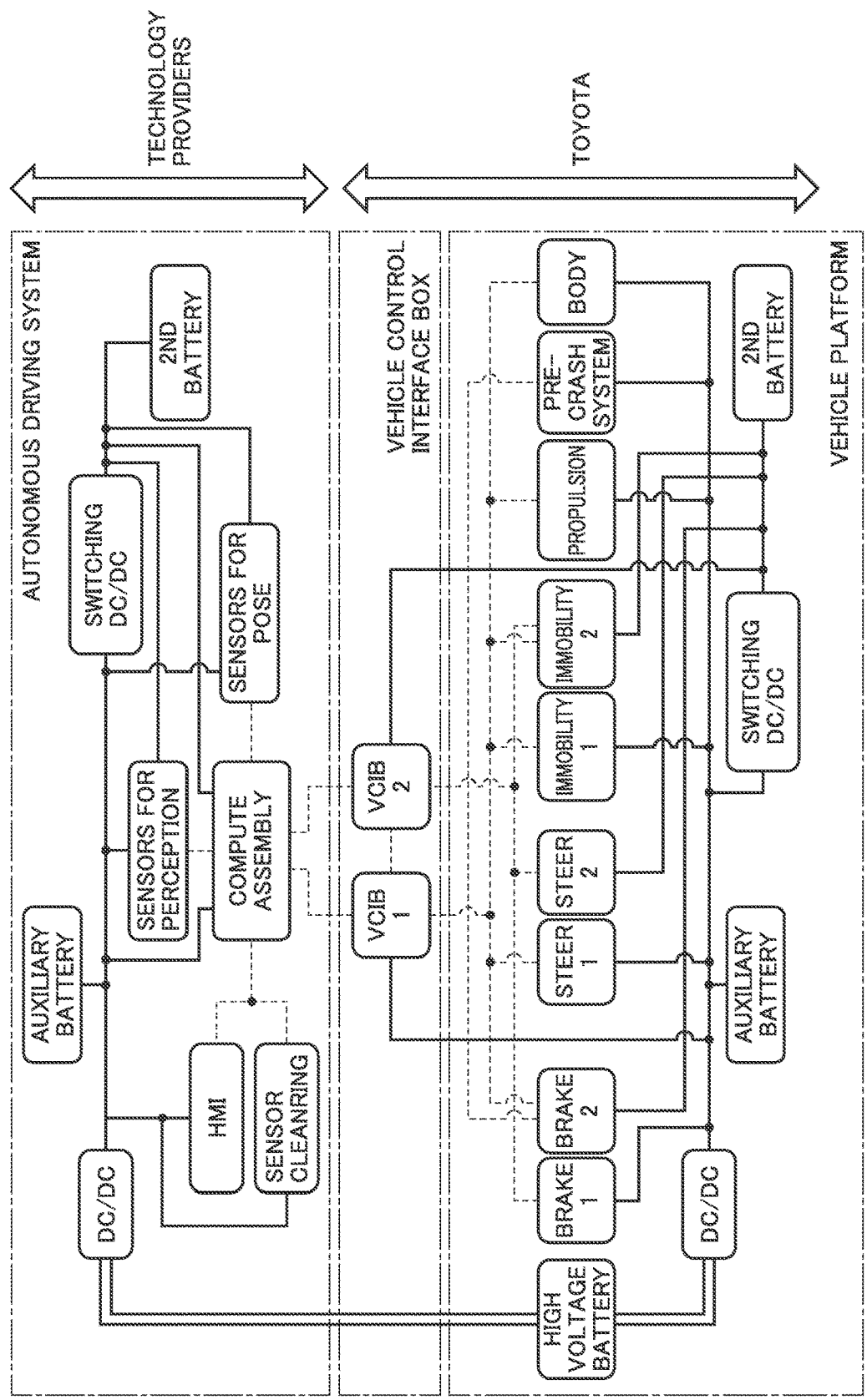
FIG. 16 is a diagram showing a configuration of supply of power of the vehicle.

The power supply architecture as a premise is shown as follows (FIG. 16).

The blue colored parts are provided from an ADS provider. And the orange colored parts are provided from the VP.

The power structure for ADS is isolate from the power structure for VP. Also, the ADS provider should install a redundant power structure isolated from the VP.

3. Safety Concept

3.1. Overall Safety Concept

The basic safety concept is shown as follows.

Figure 17:
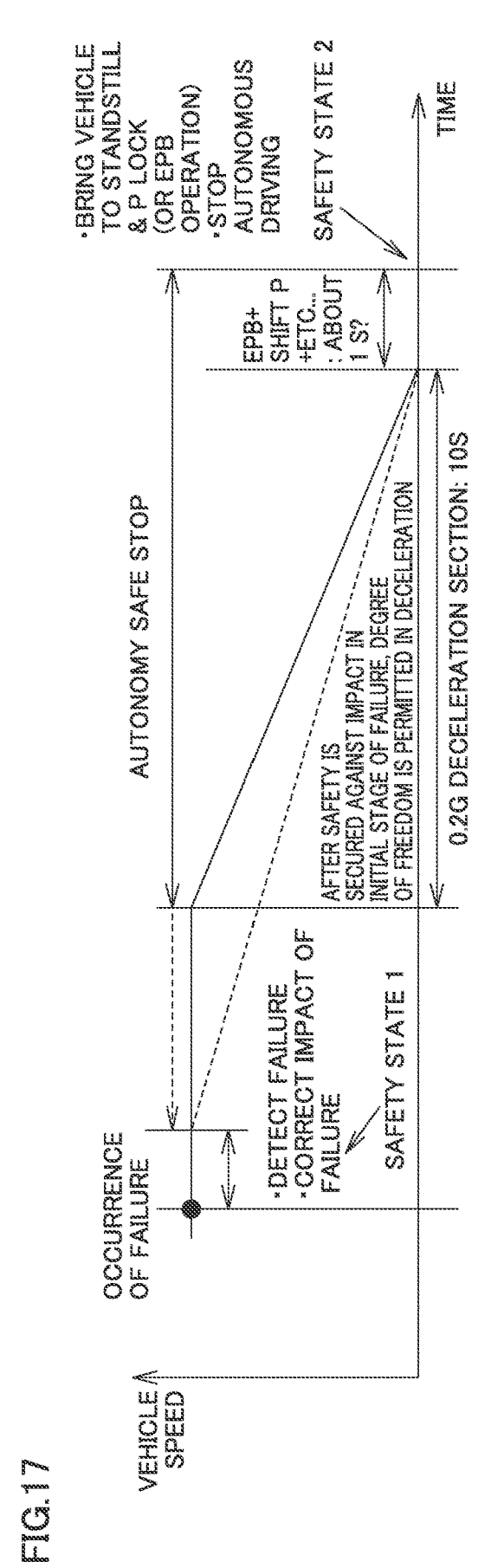
FIG. 17 is a diagram illustrating strategies until the vehicle is safely brought to a standstill at the time of occurrence of a failure.

The strategy of bringing the vehicle to a safe stop when a failure occurs is shown as follows (FIG. 17).

1. After occurrence of a failure, the entire vehicle executes "detecting a failure" and "correcting an impact of failure" and then achieves the safety state 1.

2. Obeying the instructions from the ADS, the entire vehicle stops in a safe space at a safe speed (assumed less than 0.2 G).

However, depending on a situation, the entire vehicle should happen a deceleration more than the above deceleration if needed.

3. After stopping, in order to prevent slipping down, the entire vehicle achieves the safety state 2 by activating the immobilization system.

TABLE 107

| category | content |
| --- | --- |
| Precondition | Only one single failure at a time across the entire integrated vehicle. (Multiple failures are not covered) After the initial single failure, no other failure is anticipated in the duration in which the functionality is maintained. |
| Responsibility for the vehicle platform until safety state 2 | In case of a single failure, the integrated vehicle should maintain the necessary functionality for safety stop. The functionality should be maintained for 15 (fifteen) seconds. |
| Basic Responsibility Sharing | [For ADS] The ADS should create the driving plan, and should indicate vehicle control values to the VP. [For Toyota vehicle platform] The Toyota VP should control each system of the VP based on indications from the ADS. |

See the separated document called "Fault Management" regarding notifiable single failure and expected behavior for the ADS.

3.2. Redundancy

The redundant functionalities with Toyota's MaaS vehicle are shown.

Toyota's Vehicle Platform has the following redundant functionalities to meet the safety goals led from the functional safety analysis.

Redundant Braking

Any single failure on the Braking System doesn't cause loss of braking functionality. However, depending on where the failure occurred, the capability left might not be equivalent to the primary system's capability. In this case, the braking system is designed to prevent the capability from becoming 0.3 G or less.

Redundant Steering

Any single failure on the Steering System doesn't cause loss of steering functionality. However, depending on where the failure occurred, the capability left might not be equivalent to the primary system's capability. In this case, the steering system is designed to prevent the capability from becoming 0.3 G or less.

Redundant Immobilization

Toyota's MaaS vehicle has 2 immobilization systems, i.e. P lock and EPB. Therefore, any single failure of immobilization system doesn't cause loss of the immobilization capability. However, in the case of failure, maximum stationary slope angle is less steep than when the systems are healthy.

Redundant Power

Any single failure on the Power Supply System doesn't cause loss of power supply functionality. However, in case of the primary power failure, the secondary power supply system keeps supplying power to the limited systems for a certain time.

Redundant Communication

Any single failure on the Communication System doesn't cause loss of all the communication functionality. System which needs redundancy has physical redundant communication lines. For more detail information, see the chapter "Physical LAN architecture (in-Vehicle)".

4. Security Concept

4.1. Outline

Regarding security, Toyota's MaaS vehicle adopts the security document issued by Toyota as an upper document.

4.2. Assumed Risks

The entire risk includes not only the risks assumed on the base e-PF but also the risks assumed for the Autono-MaaS vehicle.

The entire risk is shown as follows.
[Remote Attack]
To vehicle
　Spoofing the center
　ECU Software Alternation
　DoS Attack
　Sniffering
From vehicle
　Spoofing the other vehicle
　Software Alternation for a center or an ECU on the other vehicle
　DoS Attack to a center or other vehicle
　Uploading illegal data
[Modification]
Illegal Reprogramming
Setting up an illegal ADK
Installation of an unauthenticated product by a customer

4.3. Countermeasure for the Risks

The countermeasure of the above assumed risks is shown as follows.

4.3.1. The Countermeasure for a Remote Attack

The countermeasure for a remote attack is shown as follows.

Since the autonomous driving kit communicates with the center of the operation entity, end-to-end security should be ensured. Since a function to provide a travel control instruction is performed, multi-layered protection in the autonomous driving kit is required. Use a secure microcomputer or a security chip in the autonomous driving kit and provide sufficient security measures as the first layer against access from the outside. Use another secure microcomputer and another security chip to provide security as the second layer. (Multi-layered protection in the autonomous driving kit including protection as the first layer to prevent direct entry from the outside and protection as the second layer as the layer below the former)

4.3.2. The Countermeasure for a Modification

The countermeasure for a modification is shown as follows.

For measures against a counterfeit autonomous driving kit, device authentication and message authentication are carried out. In storing a key, measures against tampering should be provided and a key set is changed for each pair of a vehicle and an autonomous driving kit. Alternatively, the contract should stipulate that the operation entity exercise sufficient management so as not to allow attachment of an unauthorized kit. For measures against attachment of an unauthorized product by an Autono-MaaS vehicle user, the contract should stipulate that the operation entity exercise management not to allow attachment of an unauthorized kit.

In application to actual vehicles, conduct credible threat analysis together, and measures for addressing most recent vulnerability of the autonomous driving kit at the time of LO should be completed.

5. Function Allocation

5.1. In a Healthy Situation

Figure 18:
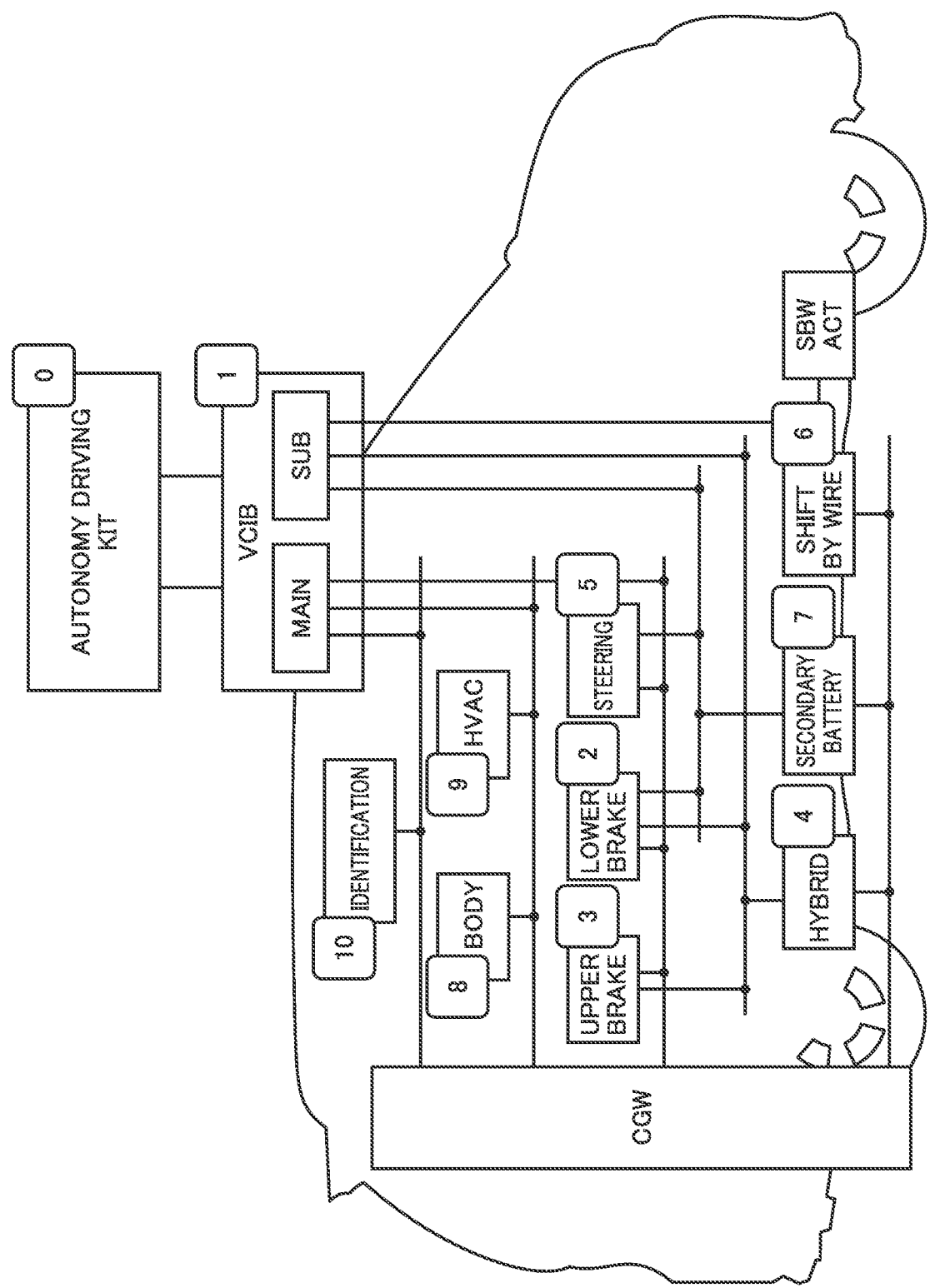
FIG. 18 is a diagram showing arrangement of representative functions of the vehicle.

The allocation of representative functionalities is shown as below (FIG. 18).
[Function allocation]

TABLE 108

| Function category | Function name | Related to # | remarks |
|---|---|---|---|
| Planning | Plan for driving path | 0 | |
| | Calculating control indications | 0 | e.g. longitudinal G |
| Overall | API Pub/Sub | 1 | One system with redundancy |
| Security | Autonomy Driving Kit Authentication | 1 | One system with redundancy |
| | Message Authentication | 1 | One system with redundancy |
| | Door locking control | 8 | |
| Longitudinal/Lateral | Motion control | 2 (Primary), 3 (Secondary) | |
| | Propulsion control | 4 | |
| | Braking control | 2, 3 | Two units controlled according to deceleration requirement |
| | Steering control | 5 | One system with redundancy |
| | Immobilization control | 2 (EPB), 6 (P Lock) | |
| | Shift control | 6 | |
| Power supply | Secondary battery control | 7 | |
| | Vehicle power control | 10 | For more information, see the API specification. |
| Access/Comfort | Body control | 8 | Turn signal, Headlight, Window, etc. |
| | HVAC control | 9 | |
| Data | Data logging (at event) | 1 | |
| | Data logging (constantly) | 1 | |

5.2. In a Single Failure

See the separated document called "Fault Management" regarding notifiable single failure and expected behavior for the ADS.

Though embodiments of the present disclosure have been described above, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A vehicle on which an autonomous driving system (ADS) is mountable, the vehicle comprising:
    a vehicle platform (VP) that controls the vehicle in accordance with an instruction from the ADS; and
    a vehicle control interface that serves as an interface between the ADS and the VP, wherein
    the VP receives a first deceleration request in accordance with an amount of depression of a brake pedal by a driver, and receives a second deceleration request from the ADS through the vehicle control interface,
    during an autonomous mode, the VP specifies a sum of the first deceleration request and the second deceleration request as a target deceleration of the vehicle,
    during the autonomous mode, the VP eliminates an accelerator pedal stroke from a vehicle acceleration demand selection,
    the VP outputs, to the ADS through the vehicle control interface, a brake pedal position signal in accordance with the amount of depression of the brake pedal by the driver,
    the VP sets a brake pedal intervention signal to:
        a first value to indicate that the brake pedal is not depressed when the brake pedal position signal indicates that the amount of depression is smaller than a threshold value,
        a second value to indicate that the brake pedal is depressed when the brake pedal position signal indicates that the amount of depression is larger than the threshold value, and
        a third value to indicate that beyond autonomy deceleration of the vehicle has occurred when the first deceleration request is larger than the second deceleration request, the VP further outputs, to the ADS through the vehicle control interface, the brake pedal intervention signal that is set to one of the first value, the second value, and the third value.

2. The vehicle according to claim 1, wherein
the vehicle platform has, as the autonomous mode, a VO (Vehicle Operation) mode and an NVO (Non-Vehicle Operation) mode,
in the VO mode that is a control mode, the driver is aboard the vehicle while the vehicle is capable of autonomous driving, and
in the NVO mode that is a control mode, the vehicle is capable of completely unmanned driving,
the vehicle platform specifies the sum as the target deceleration in either the VO mode or the NVO mode.

3. The vehicle according to claim 1, wherein, in the autonomous driving mode, a driver operation of a shift lever is not reflected in a propulsion direction status.

* * * * *